(12) United States Patent
Ishida et al.

(10) Patent No.: US 6,443,143 B1
(45) Date of Patent: Sep. 3, 2002

(54) METHOD AND APPARATUS FOR CUTTING RARE EARTH ALLOY

(75) Inventors: Hazime Ishida, Takatsuki; Sadahiko Kondo, Takarazuka; Akira Miyachi, Takatsuki, all of (JP)

(73) Assignee: Sumitomo Special Metals Co., Ltd. (JP)

(*) Notice: Subject to any disclaimer, the term of this patent is extended or adjusted under 35 U.S.C. 154(b) by 0 days.

(21) Appl. No.: 09/662,136

(22) Filed: Sep. 14, 2000

(30) Foreign Application Priority Data

Sep. 17, 1999 (JP) .......................... 11-263514
Jul. 18, 2000 (JP) ....................... 2000-217793

(51) Int. Cl.⁷ ............................. B28D 1/06
(52) U.S. Cl. ..................... 125/16.02; 125/21
(58) Field of Search ............... 125/16.02, 21, 125/16.01

(56) References Cited

U.S. PATENT DOCUMENTS 5,827,113 A    10/1998  Okuno et al.
5,937,844 A  *  8/1999  Kiuchi et al. ............ 125/16.02
6,006,738 A  * 12/1999  Itoh et al. ..................... 125/21
6,041,766 A  *  3/2000  Vojtechovsky ........... 125/16.02
6,067,976 A  *  5/2000  Katayama et al. ............ 125/21
6,161,533 A    12/2000  Katsumata et al.

FOREIGN PATENT DOCUMENTS

| JP | 63-023962 | 7/1988 |
| JP | 06-008234 | 1/1994 |
| JP | 07-106288 | 4/1995 |
| JP | 07-148641 | 6/1995 |
| JP | 08-007272 | 1/1996 |
| JP | 08-126953 | 5/1996 |
| JP | 08-243920 | 9/1996 |
| JP | 10-180750 | 7/1998 |
| JP | 11-277394 | 10/1999 |

* cited by examiner

Primary Examiner—Timothy V. Eley
Assistant Examiner—Dung Van Nguyen
(74) Attorney, Agent, or Firm—Nixon Peabody LLP; Jeffrey L. Costellia

(57) ABSTRACT

A method for cutting a rare earth alloy of the invention using a wire having abrasive grains stuck thereon is disclosed. The method includes the step of cutting the rare earth alloy while supplying a cutting fluid having a predetermined kinematic viscosity between the wire and the rare earth alloy. The method further includes the step of varying the temperature of a supplied amount of fresh cutting fluid in order to control the kinematic viscosity of the cutting fluid.

23 Claims, 14 Drawing Sheets

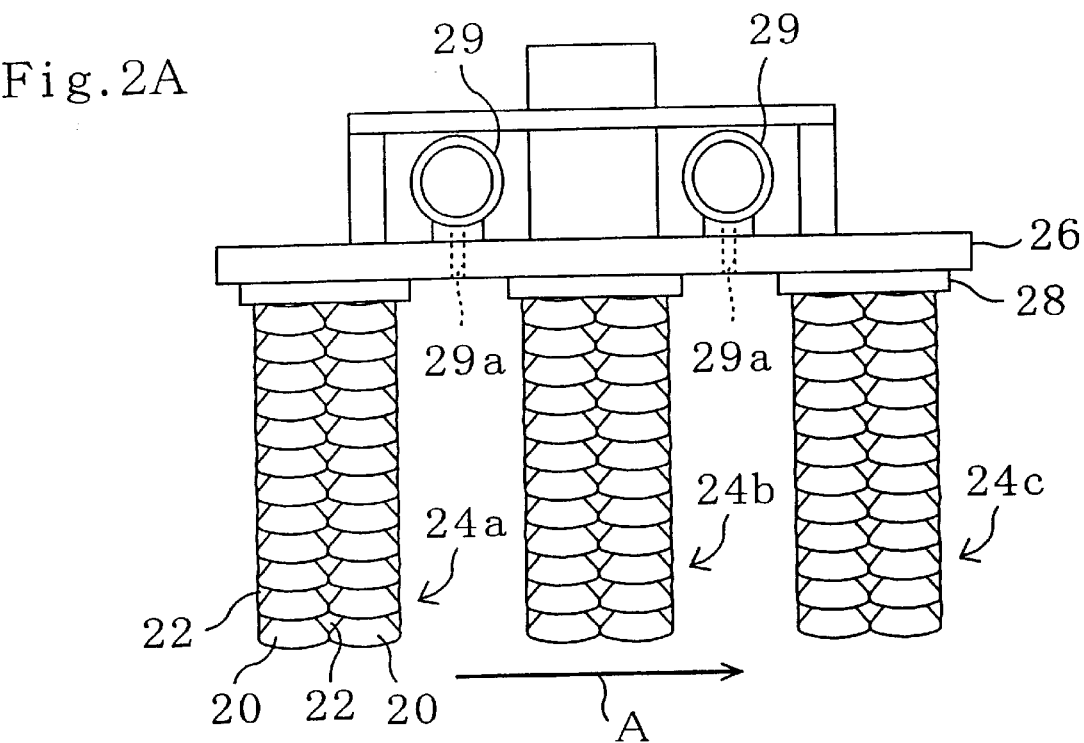
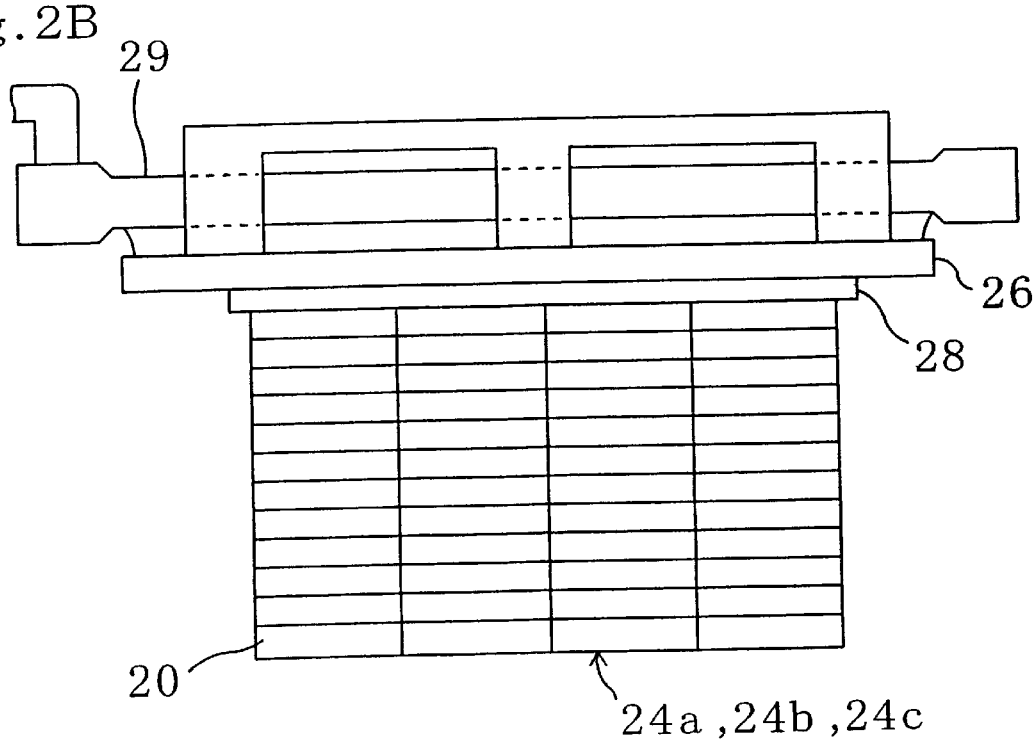

METHOD AND APPARATUS FOR CUTTING RARE EARTH ALLOY

BACKGROUND OF THE INVENTION

The present invention relates to a method and apparatus for cutting a rare earth alloy. More particularly, the present invention relates to a method and apparatus for cutting a rare earth alloy with a wire having super abrasive grains such as diamond grains stuck thereon.

Conventionally, a technique of cutting an ingot of silicon with a wire saw to slice the ingot into a large number of wafers has been developed. Japanese Laid-Open Publication No. 6-8234, for example, discloses this technique. In accordance with this technique, a large number of wafers, each having a constant thickness, can be simultaneously sliced from an ingot by cutting the ingot with a multi-wire running while supplying some slurry containing abrasive grains thereto.

On the other hand, in accordance with a known technique, an ingot of a rare earth alloy is sliced using a rotating slicing blade, for example. However, such a technique using a slicing blade requires an undesirably large cutting margin, because the cutting edge of a slicing blade is thicker than that of a wire. Therefore, such a technique fails to contribute to efficient use of valuable resources.

A rare earth alloy is suitable for use as a magnet material, for instance. A magnet has found a wide variety of applications and is now broadly used for various types of electronic appliances. Under the circumstances such as these, it is highly desirable to cut down on the manufacturing cost per rare earth magnet. And the cost would be considerably reduced if a great number of wafers could be produced simultaneously from an ingot of a rare earth alloy such that a cutting margin can be reduced by the use of a wire saw and that each wafer has a constant thickness.

However, no one has ever reported on successfully cutting a rare earth alloy in accordance with a practical wire-saw technique. The present inventors experimentally cut an ingot of a rare earth alloy with a wire saw of free abrasive grain type. As a result, we found that since a slurry-circulating pipe was clogged up in a very short amount of time with fine powder and grinding debris (i.e., swarf or sludge) involved with wire sawing, no slurry could be supplied to the wire after that, and the wire eventually snapped. If the slurry was entirely replaced every several hours in order to avoid this problem, wire sawing had to be suspended for a while every time the slurry was replaced. Thus, such machining is not suitable for mass production and it is virtually impossible to put such machining into practice. We also observed that since the sludge was easily deposited in a cut groove, the cutting resistance noticeably increased and the wire was even more likely to snap as a result. Furthermore, the cutting accuracy was found considerably deteriorated because various unwanted operating failures frequently happened during the cutting process. For example, the wire often disengaged from rollers, around which the wire was wound, because the sludge was also likely to be deposited on the grooves of the rollers. None of these problems has ever been observed during cutting an ingot of silicon or glass in accordance with a conventional wire saw technique.

The wire saw of free abrasive grain type where abrasive grains float in slurry has a problem of its own as follows. Free abrasive grains tend to roll on the cutting area during the cutting process. It is therefore difficult to increase the amount of cutting per unit time (cutting speed). In particular, when a rare earth alloy is cut with the wire saw of free abrasive grain type, the cutting speed greatly decreases, because a rare earth alloy is a rigid, tenacious material less easy to be cut, compared with silicon and glass.

Japanese Laid-Open Publication No. 8-126953 discloses a technique where an ingot of silicon is cut with a wire of fixed abrasive grain type using water as a coolant. When this technique is applied to cutting of a rare earth alloy, however, the same problems as those described above in relation with the free abrasive grain type occur, because sludge of a rare earth alloy is difficult to be carried out from the cutting grooves.

SUMMARY OF THE INVENTION

A prime object of the present invention is providing a method and apparatus for cutting a rare earth alloy to ensure a long-time continuous operation by preventing wire snapping and improve the cutting speed.

Another object of the present invention is providing a method for manufacturing rare earth magnets using the method for cutting a rare earth alloy.

Still another object of the present invention is providing a voice coil motor including a rare earth magnet manufactured by the method of the present invention.

The method for cutting a rare earth alloy of the present invention uses a wire having abrasive grains stuck thereon. The method includes the step of cutting the rare earth alloy while supplying a cutting fluid having a predetermined kinematic viscosity between the wire and the rare earth alloy.

Preferably, the kinematic viscosity of the cutting fluid supplied between the wire and the rare earth alloy is in a range of 6.0 $mm^2/s$ to 100.0 $mm^2/s$.

In a preferred embodiment, the cutting fluid is a cutting oil, and the cutting oil preferably has a viscosity at 40° C. in a range of 4.0 to 40.0 mPa·sec.

In another preferred embodiment, the cutting fluid is a glycolic water-soluble cutting fluid, and the glycolic water-soluble cutting fluid preferably has a kinematic viscosity at 25° C. in a range of 10.0 $mm^2/s$ to 67.0 $mm^2/s$.

Preferably, the kinematic viscosity of the cutting fluid is controlled by control of the temperature of the cutting fluid.

Preferably, the method further includes the steps of: recovering or collecting the cutting fluid containing sludge of the rare earth alloy generated during the cutting of the rare earth alloy; and removing the sludge from the recovered or collected cutting fluid before the control of the temperature of the cutting fluid.

The control of the temperature of the cutting fluid preferably includes the steps of: thermoregulating part of the cutting fluid from which the sludge has been removed; and mixing the thermoregulated part of the cutting fluid and the remaining cutting fluid that has not been thermoregulated, the mixed cutting fluid being supplied between the wire and the rare earth alloy.

Preferably, the sludge of the rare earth alloy generated during the cutting of the rare earth alloy is separated from the cutting fluid with a magnetic force.

Preferably, a magnetic separator capable of generating a magnetic force of 0.27 tesla or more is disposed in a region for collecting the sludge from the cutting fluid.

In a preferred embodiment, the cutting is performed using a wire saw machine comprising: a plurality of rollers supported rotatably, each of the rollers having a plurality of ring-shaped grooves formed on an outer circumference of the roller at a predetermined pitch; and driving means for rotating the rollers for allowing the wire wound along the grooves of the rollers to run.

Preferably, the rare earth alloy is cut with the wire while the rare earth alloy is moved from a position above the wire toward a position below the wire.

Preferably, the rare earth alloy is divided into a plurality of blocks and secured together, and at least part of the supply of the cutting fluid is performed through gaps between the plurality of blocks.

The method for manufacturing rare earth alloy plates of the present invention includes the steps of: producing an ingot of a rare earth alloy; and separating a plurality of rare earth alloy plates from the ingot by any of the method for cutting a rare earth alloy described above.

The method for manufacturing rare earth magnets of the present invention includes the steps of: producing a sintered body from rare earth magnetic alloy powder; and separating a plurality of rare earth magnets from the sintered body by any of the method for cutting a rare earth alloy described above.

The voice coil motor of the present invention includes the rare earth magnet manufactured by the method for manufacturing rare earth magnets described above.

In a preferred embodiment, the thickness of the rare earth magnet is in a range of 0.5 to 3.0 mm.

The apparatus for cutting a rare earth alloy of the present invention cuts a rare earth alloy with a wire. The apparatus includes: a wire having abrasive grains stuck thereon; and means for supplying a cutting fluid having a predetermined kinematic viscosity between the wire and the rare earth alloy.

Preferably, the kinematic viscosity of the cutting fluid supplied between the wire and the rare earth alloy is in a range of 6.0 $mm^2/s$ to 100.0 $mm^2/s$.

Preferably, the apparatus further includes viscosity control means for controlling the kinematic viscosity of the cutting fluid supplied between the wire and the rare earth alloy.

The viscosity control means preferably controls the kinematic viscosity of the cutting fluid by control of the temperature of the cutting fluid.

The viscosity control means preferably includes: a vessel for storing the cutting fluid; a thermoregulator for controlling the temperature of at least part of the cutting fluid stored in the vessel; and a stirrer for stirring the cutting fluid stored in the vessel.

Preferably, the apparatus further includes a magnetic separator for separating sludge of the rare earth alloy generated during the cutting of the rare earth alloy from the cutting fluid with a magnetic force.

In a preferred embodiment, the magnetic separator generates a magnetic force of 0.27 tesla or more in a region for collecting the sludge from the cutting fluid.

As used herein, the term "cutting fluid" is defined as including a water-insoluble cutting fluid (also called "cutting oil") and a water-soluble cutting fluid, excluding cutting water that contains water as a main component and has a kinematic viscosity of about 1 $mm^2/s$.

BRIEF DESCRIPTION OF THE SEVERAL VIEWS OF THE DRAWINGS

FIG. 2A is a front view of blocks of ingots secured to a work plate; and FIG. 2B is a side view thereof.

DETAILED DESCRIPTION OF THE INVENTION

Figure 1:
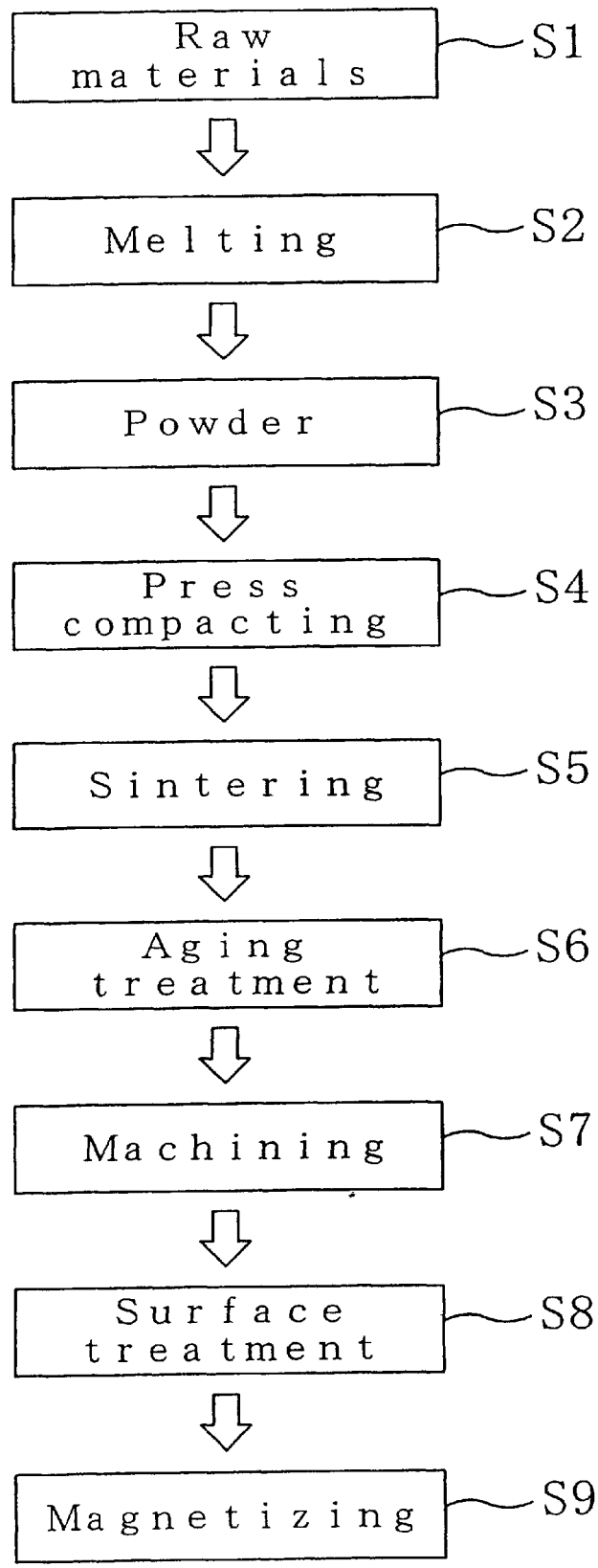
FIG. 1 is a flowchart illustrating the procedure of producing a Nd—Fe—B permanent magnet.

For improvement of cutting speed, the present inventors experimentally carried out cutting of a rare earth alloy with a wire having abrasive grains stuck thereon. Use of such a wire improves the cutting speed because the abrasive grains fixed to the wire are prevented from rolling during the cutting. According to this cutting method, slurry for suspending abrasive grains is no more required. However, cutting water needs to be supplied to a cutting region for washing away (discharging) sludge from a cut portion. From the experiment by the inventors, it was found that, using cutting water, sludge of the rare earth alloy tended to be deposited in a cut groove, and as a result, the cutting resistance noticeably increased and wire snapping was likely to easily occur. This phenomenon is also observed when the wire saw of free abrasive grain type is used. However, the increase in cutting resistance will cause a more serious problem when the wire saw of fixed abrasive grain type is used, because the amount of sludge generated by cutting of a rare earth alloy per unit time is greater when the fixed abrasive grain type is used.

The deposited sludge may obstruct circulation of the cutting water in a water-circulating pipe of a wire saw machine and thus clog the water-circulating pipe. Therefore, the machine will not be operated continuously for a longer period of time unless the cutting water is replaced frequently.

The sludge tends to settle and aggregate probably because the specific gravities of iron and a rare earth element constituting a rare earth alloy are relatively large. When an ingot of silicon or quartz glass is cut with a wire saw, sludge is quickly washed away, and hardly settles or aggregates. Therefore, no serious problems have ever occurred in relation with this matter.

It was also found that, when cutting water was used during cutting of a rare earth alloy, the wire having abrasive grains stuck thereon wore heavily. As a result, the cutting ability of the wire decreased in a short time period and thus the cutting speed greatly decreased. A rare earth alloy, which is rigid and tenacious, generates large friction when it comes into contact with the wire during cutting. Use of cutting water presumably fails to sufficiently reduce this friction during the cutting of the rare earth alloy. This matter has never caused a serious problem in the case of cutting an ingot of silicon or quartz glass, which is easier than cutting of a rare earth alloy.

In view of the above, the present inventors found that the cutting resistance might be reduced by use of a cutting fluid having a viscosity falling within a predetermined range (for example, a cutting oil containing purified mineral oil as a main component, or a glycolic water-soluble cutting fluid) in place of cutting water. The kinematic viscosity of the cutting fluid is desirably 6.0 mm$^2$/s or more as will be described later. Moreover, the present inventors conceived an idea of separating and removing sludge from the cutting fluid with a magnetic force, utilizing the nature of the sludge of a rare earth alloy of being attracted to a magnet. By adopting these measures, clogging of a circulating pipe with the cutting fluid is prevented, frequent replacement of the cutting fluid is substantially unnecessary, and the cutting machine can be operated continuously for a tremendously longer period of time compared to the prior art.

When the cutting fluid is circulated, the comparatively low initial temperature of the cutting fluid, which is near room temperature, gradually rises as the cutting fluid absorbs frictional heat generated between the wire and the rare earth alloy. The temperature of the cutting fluid may even exceed about 50° C. while the cutting fluid is circulated.

Figure 14:
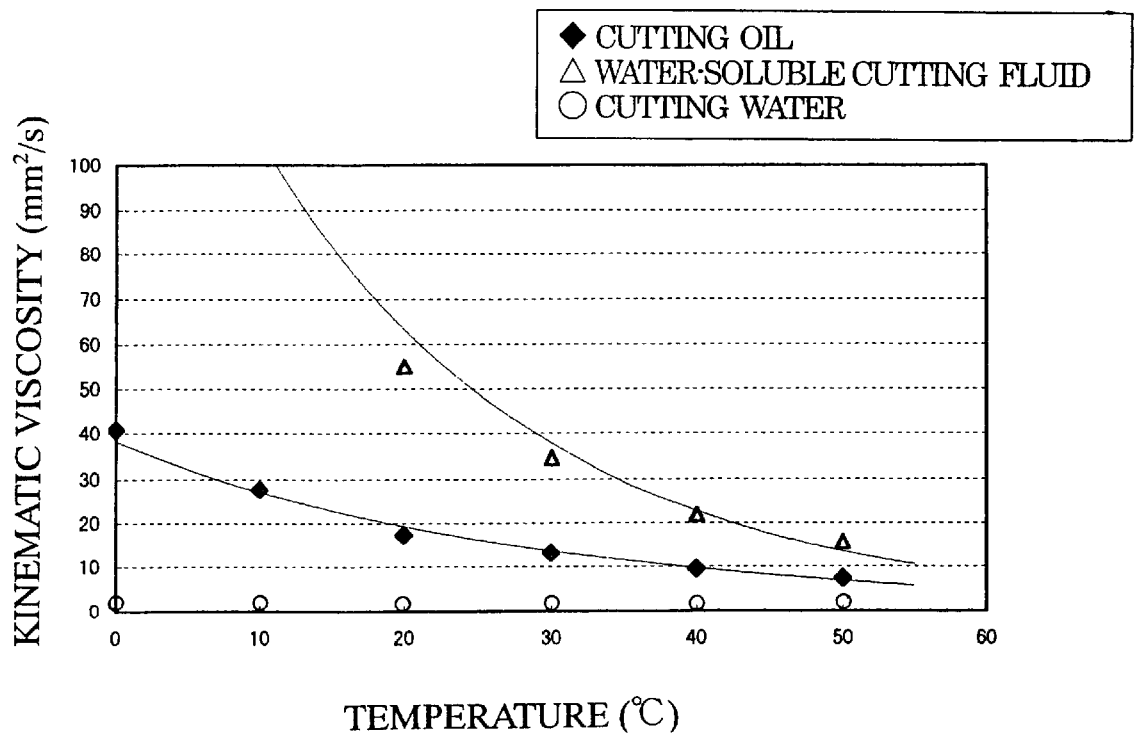
FIG. 14 is a graph showing the temperature-viscosity relationships of cutting fluids and cutting water.

According to an experiment by the present inventors, as the temperature of the cutting fluid rises, the viscosity of the cutting fluid as well as the cooling ability thereof decrease, and if a cutting fluid having a reduced viscosity is supplied, the cutting resistance increases. As shown in FIG. 14, while the kinematic viscosity of cutting water is substantially constant (about 1 mm$^2$/s) with respect to its temperature, the kinematic viscosities of cutting fluids (a cutting oil and a glycolic water-soluble cutting fluid) greatly vary with the temperatures thereof.

If the viscosity of the cutting fluid supplied between the wire and the rare earth alloy greatly decreases due to temperature rise, the flow of the cutting fluid in the cut groove generated by running of the wire presumably becomes poor. The reason is that the movement of the lower-viscosity cutting fluid is less influenced by the running of the wire (that is, the cutting fluid less easily moves together with the wire). The poor flow of the cutting fluid fails to wash away sludge of the rare earth alloy having a large specific gravity from the cut groove. The resultant sludge deposited in the cut groove increases the cutting resistance. The cutting resistance particularly significantly increases due to non-discharged sludge of the rare earth alloy since such sludge is rigid compared with sludge of silicon and the like.

The width of the cut groove formed into a rare earth alloy is small (for example, 0.3 mm or less). Accordingly, it is difficult to directly supply the cutting fluid into the cut groove. The cutting fluid is therefore first supplied to the wire, and the fluid attaching to the wire is supplied into the cut groove when the wire forms the groove. If the viscosity of the cutting fluid is too low, therefore, the cutting fluid easily drops off the wire, failing to supply a sufficient amount of cutting fluid into the cut groove. This also results in increase in cutting resistance. As the cutting resistance increases, the cutting efficiency decreases. This increases the probability of occurrence of wire snapping, and further may cause reduction in machining precision of the cut face of a rare earth magnet.

In order to solve the above problems, the present inventors experimentally adjusted the temperature of a cutting fluid having a viscosity within a predetermined range while the cutting fluid is circulated. As a result, the temperature of the cutting fluid was successfully kept within a predetermined range while the kinematic viscosity of the cutting fluid was invariably controlled to be within a desired range. This suppresses the increase of the cutting resistance and thus permits efficient cutting of a rare earth alloy with high precision. The lubricity of the cutting fluid also influences the cutting performance. Therefore, the preferable range of the kinematic viscosity of the cutting fluid may more or less vary depending on the type of the cutting fluid. The viscosity of the cutting fluid is herein defined by the kinematic viscosity (unit: mm$^2$/s) since the cutting fluid is supplied in the flowing state. Alternatively, it may be defined by the static viscosity (unit: millipascals·seconds (mPao·sec)).

Hereinafter, preferred embodiments of the present invention will be described with reference to the accompanying drawings.

First, an exemplary method for manufacturing rare earth alloy plates according to the present invention will be described. In this embodiment, a ternary rare earth alloyed compound Nd—Fe—B, mainly composed of neodymium (Ne), iron (Fe) and boron (B), may be used. Alternatively, a rare earth alloyed compound, in which Dy (dysprosium) and Co (cobalt) are substituted for part of Nd and part of Fe, respectively, in Nd—Fe—B, may also be used. Nd—Fe—B is known as a material for a very strong neodymium magnet having a maximum energy product exceeding 320 kJ/m$^3$.

A method for producing an ingot of Nd—Fe—B will be briefly described with reference to the flowchart of FIG. 1. For more details about a method for preparing a rare earth alloy as a magnet material, see U.S. Pat. No. 4,770,723, for example.

First, in Step S1 shown in FIG. 1, raw materials are exactly scaled at a predetermined ratio of mole fractions. Then, in Step S2, the raw materials are melted in a high-frequency melting furnace in vacuum or within an argon gas ambient. The molten raw materials are cast into a water-cooled mold, thereby preparing a raw material alloy at the predetermined ratio. Next, in Step S3, the raw material alloy is pulverized to prepare fine powder having a mean particle size of about 3 to about 4 μm. Subsequently, in Step S4, the fine powder is introduced into a die assembly and subjected to press compacting in a magnetic field. During this process step, the press compacting is performed after the fine powder has been mixed with a lubricant if necessary. Then, in Step S5, a source material of a neodymium magnet is formed by conducting a sintering process at about 1,000° C. to about 1,200° C. Thereafter, in Step S6, an aging treatment is performed at about 600° C. in order to increase the coercive force of the magnet. An ingot of a rare earth alloy can be prepared in this manner. The size of the ingot is 30 mm×50 mm×60 mm, for example.

In Step S7, the ingot of the rare earth alloy is cut and machined, thereby slicing the ingot into a plurality of thin plates (these plates will be called sometimes "substrates" and sometimes "wafers"). Before the steps from Step S8 on are described, a method for cutting the ingot of a rare earth alloy in accordance with the wire saw technique of the present invention will be described in detail below.

FIGS. 2A and 2B will be referred to. First, a plurality of ingots 20, produced in accordance with the method described above, are bonded to each other with an adhesive 22 made of an epoxy resin, for example. And the ingots 20 are secured to a ferrous work plate 26 after these ingots have been stacked one upon the other to form a plurality of blocks 24a through 24c. The work plate 26 and the blocks 24a through 24c are also bonded to each other with the adhesive 22. More specifically, a base plate 28 made of carbon is placed as a dummy between the work plate 26 and each of the blocks 24a through 24c. The carbon base plates 28 are also bonded to the work plate 26 and the blocks 24a through 24c with the adhesive 22. The carbon base plates 28 are cut by a wire saw after the blocks 24a through 24c have been cut and until the work plate 26 stops lowering. That is to say, the base plates 28 function as a dummy for protecting the work plate 26.

In this embodiment, the size of each of the blocks 24a through 24c is designed at about 100 mm when measured in the direction indicated by the arrow A in FIG. 2A (hereinafter, this direction is called a "wire running direction"). Since the size of each ingot 20 measured in the wire running direction is about 50 mm in this embodiment, each of the blocks 24a through 24c is made up by stacking a pair of ingots 20, disposed side by side in the wire running direction, one upon the other.

Also, in this specification, the ingots 20 secured to the work plate 26 are collectively called as "work", By dividing this work into a plurality of blocks, the following effects can be attained.

If the size of a mass of work in the wire running direction is so large as to exceed the maximum distance the cutting fluid can reach, then the cutting fluid cannot be supplied sufficiently to some of the regions of the work to be cut. As a result, a wire possibly snaps. However, since the work of this embodiment is divided into blocks 24a through 24c of an appropriate size, the cutting fluid can be supplied into the gaps between the blocks 24a through 24c and therefore the problem of insufficiently supplied cutting fluid can be solved. This also allows sludge deposited between abrasive grains on the wire to be washed away. The cutting efficiency therefore improves.

In this embodiment, two cutting fluid supply pipes 29 are disposed on the upper side of the work plate 26 to supply the cutting fluid into the gaps between the blocks 24a through 24c. And fresh cutting fluid is sprayed downward from the cutting fluid supply pipes 29 and through slit-shaped nozzles 29a. The cutting fluid supply pipes 29 receive fresh cutting fluid not containing sludge or cutting fluid, from which the sludge has been removed, from a cutting fluid supply tank (described later). The cutting fluid supply pipes 29 have a double pipe structure, for example. And the width of each of the slits 29a under the pipes 29 is designed to change in the longitudinal direction so as to supply the cutting fluid uniformly.

In this embodiment, the work is divided into a plurality of blocks in the manner described above. However, the size of each of the blocks 24a through 24c when measured in the wire running direction is variable with the viscosity of the cutting fluid and the wire running speed. The number and disposition of ingots 20 making up one block are also variable with the size of each ingot 20. Accordingly, the work should be appropriately divided into blocks of an optimum size in view of these factors. In this embodiment, the cutting fluid supply pipes 29 are disposed on the upper side of the work plate 26. Alternatively, they may be disposed on the lower side of the work plate 26 to supply the cutting fluid to the gaps between the blocks 24a through 24c.

Next, the main portion 30 of the wire saw machine preferably used in this embodiment will be described with reference to FIGS. 3A and 3B. This wire saw machine includes three main rollers 34a through 34c, around which a single wire 32 can be wound multiple times. Among these rollers, two rollers 34a and 34b are rotatably supported by the wire saw machine, but are not directly connected to any driving means such as a motor. Thus, these rollers function as coupled driving rollers. In contrast, the other main roller 34c is connected to a driver such as a motor (not shown), receives desired rotation force from the driver, and can rotate at a set speed. The main roller 34c can transmit rotation force to the other two main rollers 34a and 34b via the wire 32, and therefore functions as a driving roller.

The wire 32 is guided while receiving a tension of several kilograms weight in accordance with the rotation of the main rollers 34a through 34c. And the wire 32 is let out from a reel (not shown) and wound on another reel (not shown, either) while moving at a predetermined speed (for example, 600 to 1,000 m/min). The moving direction of the wire can be changed alternately.

On the outer surface of each main roller 34a, 34b, 34c, a plurality of grooves are formed at regular intervals, and the single wire 32 is wound on each roller so as to be engaged with these grooves. The arrangement pitch of the wire 32 (i.e., a gap between adjacent lines of the wire) is defined by the pitch of the grooves. In this embodiment, this pitch is set at about 2.0 mm. This pitch is set in accordance with the thickness of a thin plate to be sliced off an ingot by cutting, and therefore multi-groove rollers 34a through 34c having an appropriate pitch are selectively used.

Figure 6:
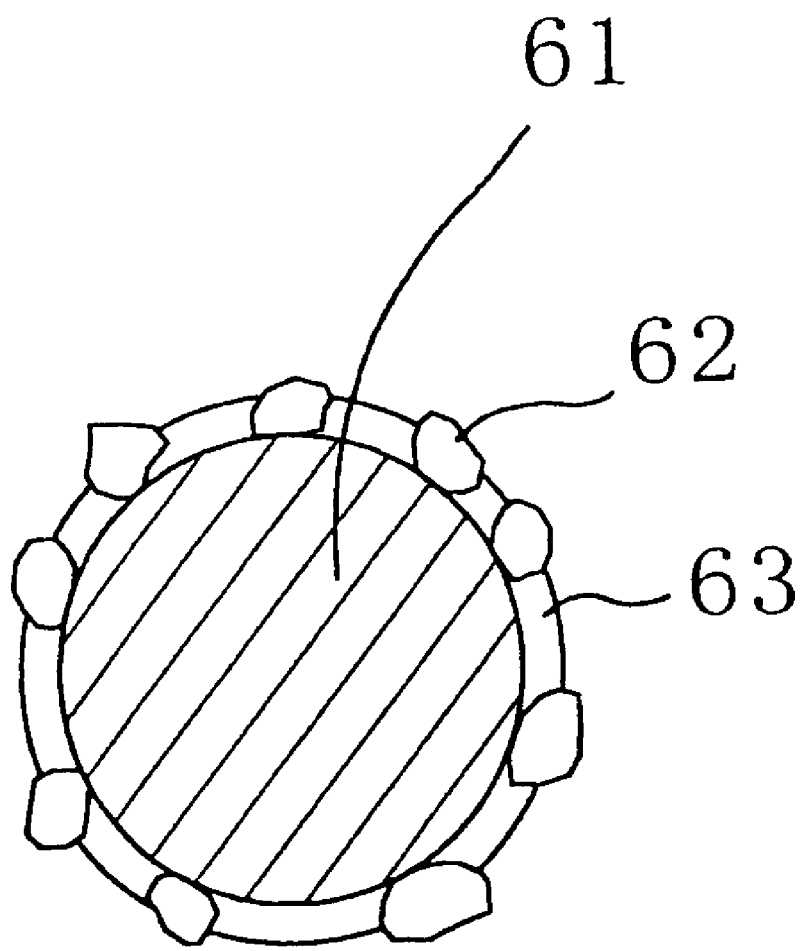
FIG. 6 is a cross-sectional view of a wire.

The wire 32 is made of hard drawn steel wire (e.g., piano wire) and the thickness thereof is set in the range of about 0.06 mm to about 0.25 mm. FIG. 6 illustrates the wire in cross section. As is observed from FIG. 6, diamond abrasive grains 62 having a diameter of 30 to 60 μm are stuck on the circumference of a wire core 61 via a resin film 63. The resin film 63 is made of a phenol resin, for example, and has a thickness of 0.02 to 0.04 mm, for example. The abrasive grains 62 stuck on the wire are apart from one another. Preferably the distance between the centers of adjacent grains is about two to four times the diameter of the abrasive grains 62. The diamond abrasive grains 62 may be struck on the wire via a metal film such as a Ni film in place of the resin film 63.

The wire core 61 may be made of an alloy such as Ni—Cr and Fe—Ni, a metal having a high melting point, such as W and Mo, or a bundle of nylon fibers. The material for the abrasive grains is not limited to diamond, but may also be SiC, B, C, CBN (cubic boron nitride), or the like.

During the cutting process, the work is pressed against a portion of the running wire 32 that is stretched between the main rollers 34a and 34b. In this embodiment, the cutting fluid can be supplied onto the wire 32 from at least three points, two of which correspond to the pipes 29 and the slit-shaped nozzles 29a disposed in and above the work plate 26 to supply the cutting fluid through the gaps between the blocks. The other cutting fluid supply point is a nozzle 36 located on the left-hand side of the work in FIG. 3B. Optionally, the cutting fluid may be supplied not only from these nozzles 29a and 36 but also from other nozzles. For example, the cutting fluid may be additionally supplied from the right-hand side of the work in FIG. 3B.

In this embodiment, the material for the cutting fluid supplied between the work and the wires is selected or the composition of the cutting fluid is adjusted so that the kinematic viscosity of the cutting fluid is in the range of 6.0 to 100.0 mm$^2$/s. The width of the cut groove formed into the work is very small, typically about 0.3 mm or less. Accordingly, it is difficult to directly supply the cutting fluid into the cut groove. The cutting fluid is therefore first supplied to the wire, and the fluid attaching to the wire is supplied into the cut groove when the wire forms the groove. Thereafter, the cutting fluid is discharged from the cut groove. If the kinematic viscosity of the cutting fluid supplied in the above manner is less than 6.0 mm$^2$/s, the flow of the cutting fluid generated by the running of the wire is low. With low flow of the cutting fluid, sludge of a rare earth alloy having a large specific gravity will not be easily discharged from the cut groove. As a result, the cutting resistance increases. If the kinematic viscosity of the cutting fluid is low, also, the cutting fluid easily drops off the wire, failing to supply a sufficient amount of cutting fluid into the cut groove. On the contrary, if the kinematic viscosity of the cutting fluid is more than 100.0 mm$^2$/s, the cutting fluid is less likely to drop off the wire. However, it is difficult to introduce the cutting fluid having the excessively high viscosity into the very narrow cut groove, and if introduced, it is difficult to discharge the cutting fluid from the cut groove. Therefore, in this case, also, sludge will not be easily discharged, and as a result, the cutting resistance increases. Moreover, if a sufficient amount of cutting fluid is not supplied into the cut groove, the lubricity is not sufficient between the wire and the rare earth alloy (i.e., sharpness of the cutting decreases), which degrades the surface roughness and size precision of the cut face. This results in increasing the time taken to perform grinding in a subsequent process step, and thus lowers production efficiency. If the lubricity is not sufficient between the wire and the rare earth alloy, also, greater friction is generated therebetween and thus the wear of the wire increases. As a result, the cutting efficiency largely decreases, and the life of the wire is shortened.

In this embodiment, the cutting fluid having a viscosity falling within the above range is used. Thus, sludge (i.e., rare earth alloy particle having a large specific gravity, such as a neodymium alloy having a specific gravity of about 7.5) produced in a cut groove being formed into a rare earth alloy is allowed to rapidly flow out of the cut groove (i.e., the discharge efficiency is high) and can be expelled from the region subjected to the cutting process. Accordingly, the sludge in the cut groove does not strongly interfere with the wire's running and the problems of wire snapping and reduction in cutting efficiency owing to the increase in cutting resistance can be solved. In addition, by using the cutting fluid having a comparatively low viscosity, the amount of sludge transported by the running wire to the main rollers can be reduced. As a result, the deposition of the sludge within the grooves of the main rollers can also be suppressed. Consequently, wire snapping can be prevented and the wire can be easily detached from the work after the work has been cut. The kinematic viscosity of the cutting fluid supplied between the wire and a rare earth alloy is preferably in the range of 13.0 to 90 mm$^2$/s, more preferably in the range of 13.0 to 80 mm$^2$/s.

As the cutting fluid, a water-insoluble cutting fluid (cutting oil) or a water-soluble cutting fluid may be used. An example of the water-insoluble cutting fluid is a cutting oil containing purified mineral oil as a main component, an ester (25 to 35%), an anticorrosive additive (less than 1%), and a sulfuric extreme-pressure additive (less than 1%) (HT-9 of Yushiro Chemical Industry Co., Lid.). Since this cutting oil is inexpensive, cost reduction is possible. An example of the water-soluble cutting fluid is a glycolic cutting fluid (WL-2 of Yushiro Chemical Industry Co., Ltd.). A water-soluble cutting fluid is less likely to pollute the environment than a water-insoluble cutting fluid (oil). A water-soluble cutting fluid is also safe with reduced risk of smoking and flaming, and free from generating oil mist. Therefore, use of a water-soluble cutting fluid contributes to improvement of the work environment. Further, a water-soluble cutting fluid is suitable for reuse since sludge in the cutting fluid can be easily removed therefrom.

Figure 3A:
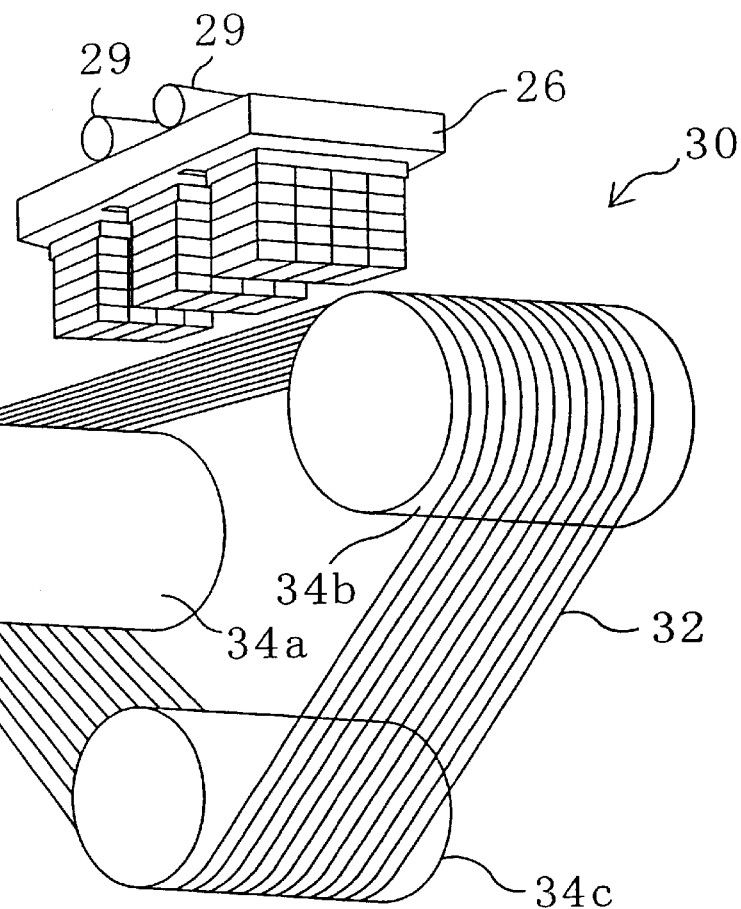
FIG. 3A is a perspective view illustrating the main portion of a wire saw machine preferably used in an embodiment of the present invention.
Figure 3B:
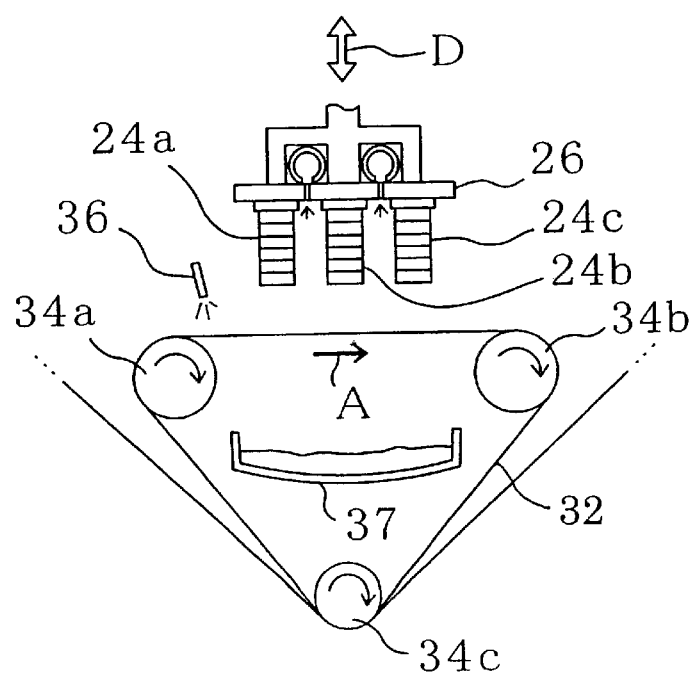
FIG. 3B is a front view thereof.

FIG. 3B will be referred to. During the work cutting process, the work plate 26 is moved downward along the arrow D by a driver (not shown) at a predetermined speed (e.g., 0.5 to 1.0 mm/min), so that the work secured to the work plate 26 is pressed against the wire 32 running horizontally (along the arrow A). By supplying a sufficient amount of cutting fluid between the work and the wire 32, sludge is discharged from between the work and the wire 32, whereby the work can be cut continuously. If the work plate 26 is lowered at a higher speed, the cutting efficiency can be improved. However, since the cutting resistance increases in such a case, the wire 32 is likely to wave and the planarity of the cut face of the work possibly decreases. If the planarity of the cut face of the work decreases, the time taken to perform grinding during a subsequent process step increases or defective products are formed at a higher percentage. Accordingly, it is necessary to set the lowering speed, or the cutting speed, of the work within an appropriate range.

When the work is moved downward, the wire 32 wound at a predetermined pitch grinds the work as a multi-wire saw, thereby simultaneously forming a large number of machined grooves (cut grooves) into the work and increasing the depth of the grooves as the machining proceeds. And when the machined grooves have completely passed through each ingot, the cutting process on the ingot is finished. As a result, a large number of wafers (or plates), each having a thickness determined by the pitch of the wire lines and the thickness of the wire, are sliced from the ingot simultaneously. After all the ingots 20 have been cut, the work plate 26 is lifted by the driver along the arrow D. Thereafter, the respective blocks are ed from the work plate 26 and then the cut wafers are removed from each block.

In this embodiment, the cutting process is carried out while lowering the work from above the wire 32. Accordingly, the ingots 20, which have already been cut, are still bonded to the work plate 26 with the adhesive 22 and lowered along with the work plate 26. In other words, the ingots 20, which have already been cut, are located under the wire 32. Accordingly, even if the cut portions of the work happen to separate or drop from the work, such portions never come into contact with the wire 32 again. Thus, the alloy plates already cut are passed to the next process step while maintaining high quality.

Figure 4:
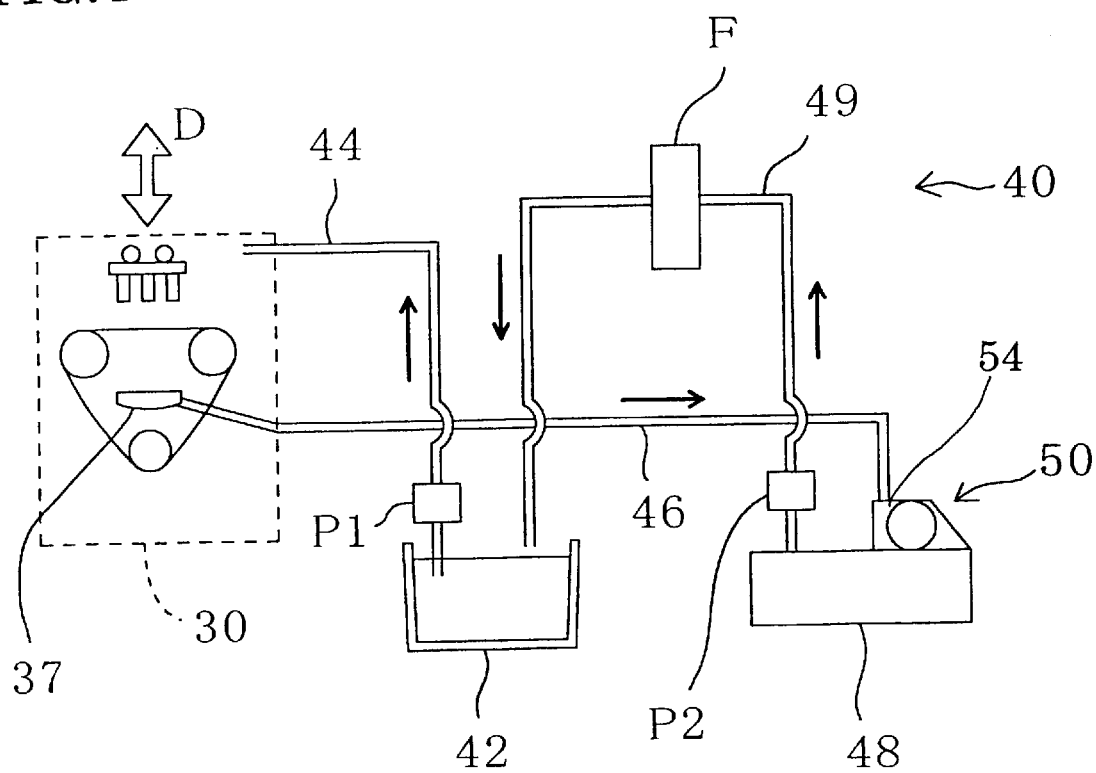
FIG. 4 is a schematic representation illustrating a cutting fluid circulating system of the wire saw machine.

Next, the schematic arrangement of a cutting fluid circulating system of the wire saw machine 40 will be described with reference to FIG. 4. As schematically shown in FIG. 4, the wire saw machine 40 includes a cutting fluid circulating system for supplying the cutting fluid to the main portion 30 of the machine 40 and for recovering the used cutting fluid containing the sludge involved with the machining.

In this machine 40, the cutting fluid is supplied from a cutting fluid supply tank 42 through a first circulating pipe 44 into the cutting fluid supply pipes 29 and the nozzles 36 above and in the work plate 26 shown in FIGS. 3A and 3B during the cutting process of the work. A pump PI is used for this supply. The cutting fluid, which has been used for cutting, drips from the machined part and the surrounding regions thereof so as to be received by a recovering drain 37 located under the work plate 26. Then, the cutting fluid is transported from the recovering drain 37 through a second circulating pipe 46 into a separation reservoir 54, where the cutting fluid is subjected to a sludge separation process by a magnetic separator 50, which will be described later. The cutting fluid is then reserved in a recovery tank 48. The cutting fluid, which has substantially regained its initial state before the cutting process by the sludge separation process, is transported through a third circulating pipe 49 into the cutting fluid supply tank 42. A relay pump P2 is used for this transportation. A filter F is inserted midway the third circulating pipe 49 for removing sludge that has escaped the removal by the magnetic separator 50. A bag-shaped filter is preferably used as the filter F.

Fine sludge that has passed through the filter F is settled in the cutting fluid supply tank 42. Fine sludge tends to aggregate together since it has been magnetized by the magnetic separator 50, and thus is easily settled. Therefore, the amount of sludge remaining in the cutting fluid to be supplied into the main portion 30 through the first circulating pipe 44 can further be reduced.

In this embodiment, while the supply and recovery of the cutting fluid are performed in a cyclic fashion, the separation and removal of the sludge are carried out efficiently in this manner Accordingly, replacement of the cutting fluid is not required for a considerably long duration, and thus the cutting process can be performed continuously for a very long period of time.

When a cutting oil is used, in particular, in order to maintain the viscosity of the cutting oil within a desired range, new cutting oil is preferably supplied at appropriate time intervals. In such a case, the viscosity of the cutting oil may be actually measured at regular intervals and if the viscosity of the cutting oil is out of the defined range, new cutting oil may be supplied to the machine (e.g., the cutting fluid supply tank 42) as required. Such partial supply of the cutting fluid is totally different from the conventional overall replacement of cutting oil in that this supply can be made without suspending the cutting process.

Figure 5:
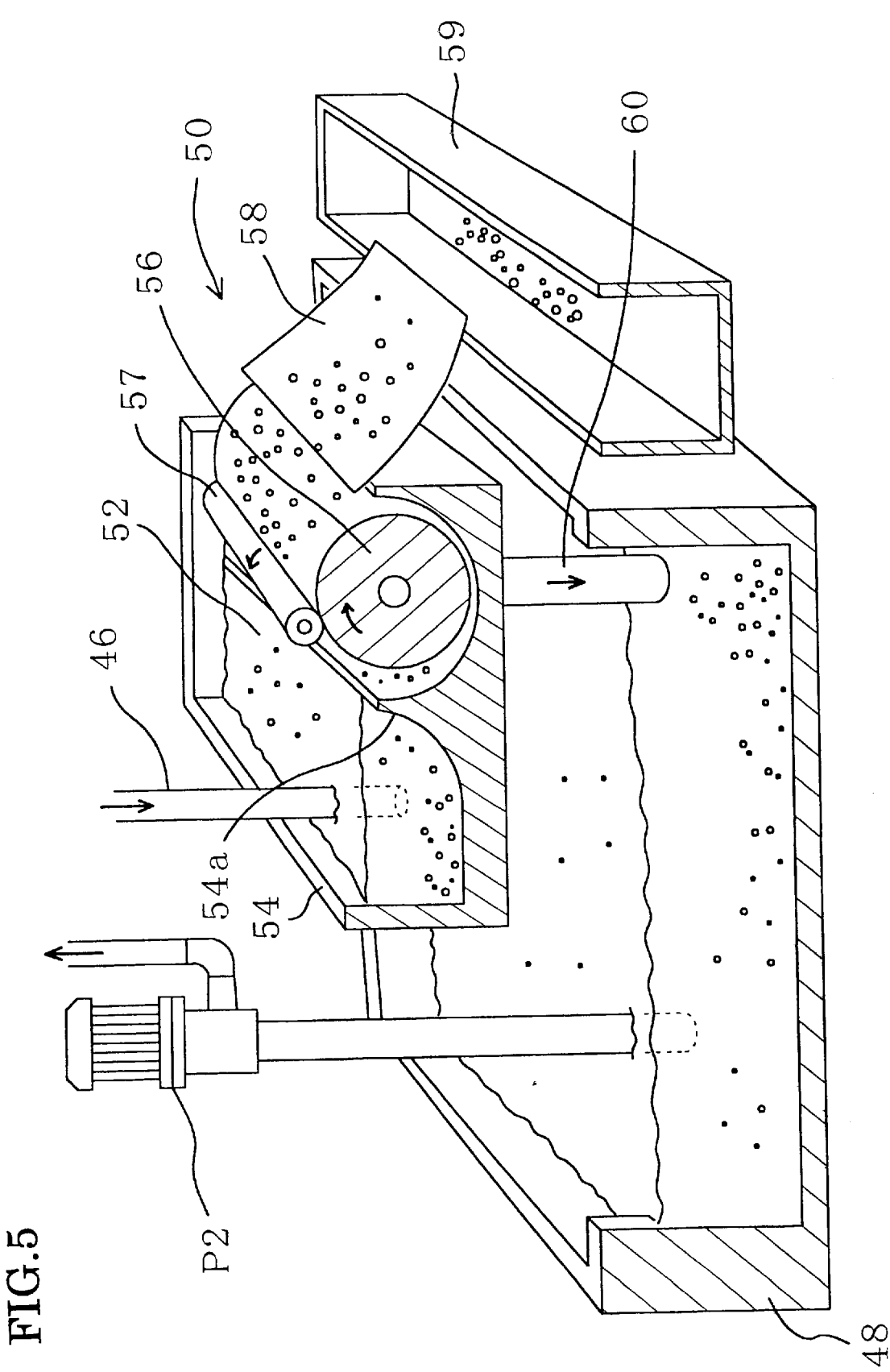
FIG. 5 is a perspective view illustrating a magnetic separator provided for the wire saw machine.

Next, the magnetic separator 50 will be described with reference to FIG. 5. The magnetic separator 50 generates a magnetic field to separate the sludge from the used cutting fluid (dirty fluid) 52 containing the sludge and reserved in the separation reservoir 54. The separation reservoir 54 is provided with a partition 54a, which functions to settle a large size of the sludge in the separation reservoir 54. Fine sludge floating in the dirty fluid 52 that has passed the partition 54a together with the dirty fluid 52 are magnetically separated from the dirty fluid 52 in the manner described below in detail.

The magnetic separator 50 includes: a drum 56 in which a strong magnet (a permanent magnet or a electromagnet) is disposed; and a squeezing roller 57 rotating while keeping in close contact with part of the outer circumference of the drum 56. The drum 56 is supported to be rotatable around a fixed axis and to be in partial contact with the cutting fluid 52 in the separation reservoir 54. The squeezing roller 57 is made of oilproof rubber or the like and is pressed against the outer circumference of the drum 56 owing to the urging force of a spring. When the drum 56 is rotated by a motor (not shown) in the direction indicated by the arrow, the rotation applies frictional force to the squeezing roller 57 and thereby rotationally drives the squeezing roller 57.

The sludge floating in the cutting fluid 52 is attracted by the magnet in the drum 56 and attached to the outer circumference of the rotating drum 56. The sludge, attached to the outer circumference of the drum 56, is removed from the cutting fluid 52 with the rotation of the drum 56, and then passes between the drum 56 and the squeezing roller 57. Then, the sludge is scraped off the surface of the drum 56 by a scraper 58 and then collected in a sludge box 59. The resultant cutting fluid left after the removal of the sludge is collected in the recovery tank 48 through a pipe 60 located at an end of the length of the drum 56. An exemplary structure of means for removing sludge usable as the magnetic separator 50 is disclosed, for example, in Japanese Utility Model Publication No. 63-23962. According to the results of experiments performed by the present inventors (described later), the magnetic force at the outer circumference (sludge attraction face) of the drum 56 in the cutting fluid 52 is preferably set at 0.27 tesla or more, more preferably at 0.3 tesla or more, to attract the sludge of the rare earth alloy in the cutting fluid to the surface of the drum 56. Since the viscosity of the cutting fluid is comparatively low in this embodiment, the magnetic separator 50 can advantageously collect the sludge of the rare earth alloy easily. This is because a lot of sludge can be collected more efficiently owing to the reduction in viscous drag applied to the sludge moving in a magnetic field formed in the cutting fluid 52.

If the sludge is removed efficiently by using such a separator, the density of the sludge in the cutting fluid used cyclically can be kept low, and the viscosity of the cutting fluid can be kept low. Therefore, the cutting load applied to the wire at the cut face of the work can be maintained at a sufficiently low level for a long period of time.

Another embodiment of the cutting fluid circulating system, which is provided with a thermoregulator, will be described with reference to FIGS. 7 and 8. The same components as those of the circulating system shown in FIGS. 4 and 5 are denoted by the same reference numerals, and portions different in construction from the circulating system shown in FIGS. 4 and 5 will be mainly described hereinafter.

Figure 7:
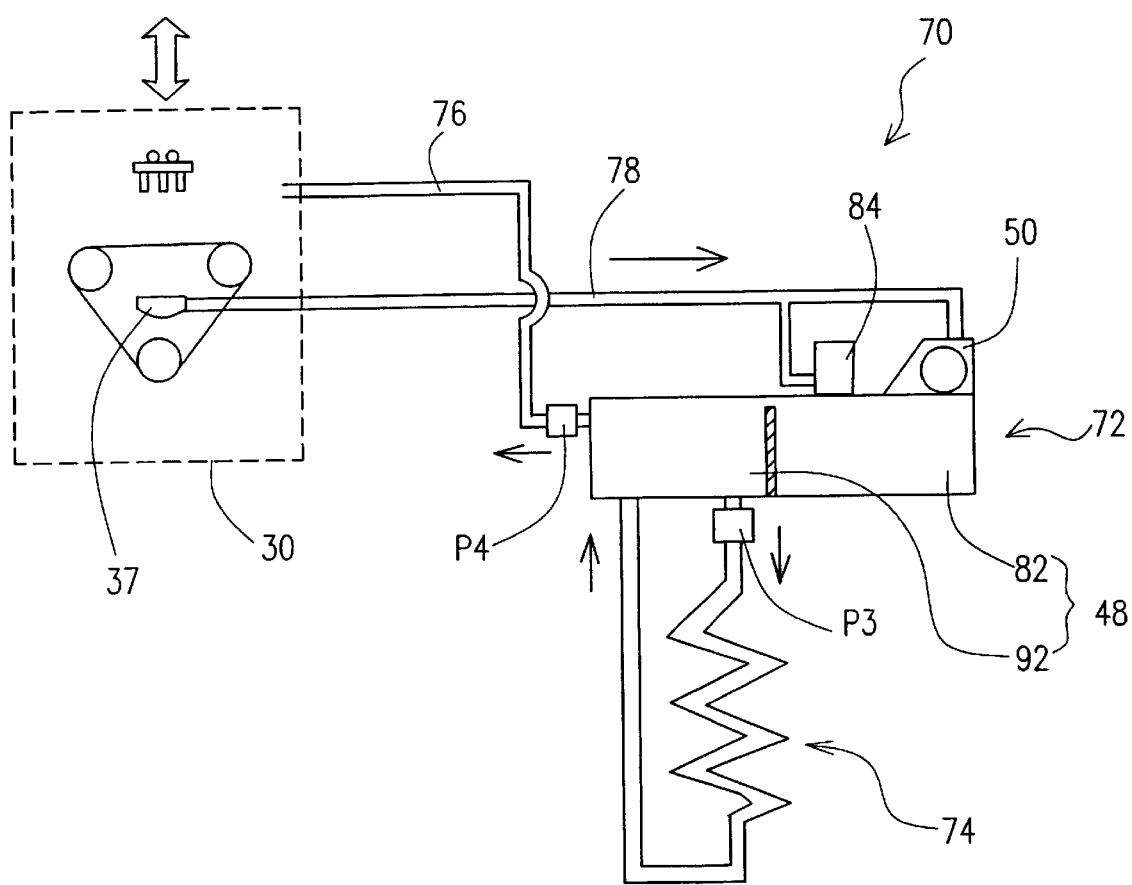
FIG. 7 is a schematic representation illustrating another cutting fluid circulating system of the wire saw machine.

In a cutting fluid circulating system 70 of this embodiment shown in FIG. 7, the cutting fluid is supplied to the main portion 30 of the wire saw machine from a purifier 72 through a first circulating pipe 76 during the cutting process of the work. The dirty fluid received by the recovering drain 37 disposed in the main portion 30 is transported through a second circulating pipe 78 into the purifier 72, where the cutting fluid is subjected to a sludge separation process by the magnetic separator 50 described above and a bag filter 84. The processed cutting fluid is then reserved in a recovery tank 48 composed of a separation reservoir 82 and a thermoregulation reservoir 92.

In the main portion 30, the temperature of the cutting fluid circulating in the circulating system 70 rises as a whole due to frictional heat generated between the wire and a rare earth magnet and absorbed by the cutting fluid. With the temperature rise, the viscosity of the cutting fluid decreases, and thus the cutting resistance during the cutting process increases.

To overcome this problem, the circulating system 70 includes a thermoregulator 74 connected to the purifier 72. The thermoregulator 74 keeps the temperature of the cutting fluid used cyclically within a predetermined range. As the thermoregulator 74, a known thermoregulator provided with a heat exchanger and the like (for example, a temperature controller described in Japanese Patent Publication No. 8-25125) can be used. Preferably, the thermoregulator 74 has both cooling and heating functions.

The thermoregulator 74 is activated when the temperature of the cutting fluid exceeds a predetermined value, for example. In this way, the temperature of the cutting fluid to be supplied to the main portion 30 can be controlled to fall within a predetermined range. By this thermoregulation of the cutting fluid, the cutting fluid to be supplied between the wire and a rare earth magnet is maintained in an appropriate viscous state, and thus the increase in cutting resistance is suppressed. As a result, the rare earth magnet can be cut continuously without the necessity of replacement of the cutting fluid.

Hereinafter, the purifier 72 will be described in detail with reference to FIG. 8. The purifier 72 is divided into two sections: a separation section 80 including the magnetic separator 50 described above and the separation reservoir 82; and a thermoregulation section 82 including the thermoregulation reservoir 92. The separation section 80 and the thermoregulation section 82 are separated by a partition 88, which blocks free movement of the cutting fluid between the two reservoirs. A communicating portion 88a is defined in the upper part of the partition 88 (in the illustrated example in FIG. 8, shown as a gap formed in the upper part of the partition 88 where the height is lower than that of the walls of the reservoirs 82 and 92). The cutting fluid can move between the reservoirs through the communicating portion 88a. In other words, the separation reservoir 82 and the thermoregulation reservoir 92 communicate with each other in such a manner that fluid is allowed to move therebetween only in the upper parts of the reservoirs.

In the separation section 80, the dirty fluid transported from the main portion 30 of the wire saw machine is supplied to the magnetic separator 50 and the bag filter 84. The magnetic separator 50 can treat a mass of cutting fluid in a short period of time and is suitable for removing a comparatively large size of sludge. The bag filter 84 is suitable for removing a comparatively small size of sludge. The ratio of supply of the cutting fluid to the separation devices (i.e., the magnetic separator 50 and the bag filter 84) can be appropriately set depending on the throughputs of the separation devices, the size and amount of the sludge contained in the cutting fluid, and the like. By this appropriate setting, efficient sludge separation is attained. For example, the ratio of supply of the cutting fluid to the magnetic separator 50 to supply to the bag filter 84 may be set at 8:2. The separation devices may be arranged differently. For example, part of the cutting fluid flowing out from the magnetic separator 50 may be transported into the bag filter 84 for filtering.

The cutting fluid from which sludge has been removed by the magnetic separator 50 is transported into the separation reservoir 82 through a pipe 85 located at an end of the length of the drum 56. The cutting fluid from which sludge has been removed by the bag filter 84 is transported into the separation reservoir 82 through a pipe 86. The capacity of the separation reservoir 82 is set at about 200 L, for example.

The cutting fluid that has flowed into the separation reservoir 82 through the pipes 85 and 86 is temporarily stored in the separation reservoir 82, being blocked by the partition 88 from directly flowing into the thermoregulation reservoir 92. During this storage, sludge that has escaped the removal by the magnetic separator 50 or the bag filter 84 is settled in the separation reservoir 82. As a result, only supernatant portion of the cutting fluid in the separation reservoir 82 is allowed to overpass the partition 88 to flow into the thermoregulation reservoir 92.

The sludge that has been settled in the separation reservoir 82 is returned to the magnetic separator 50 via a sludge-absorbing pump 87. By this pumping, the amount of sludge in the separation reservoir 82 can be reduced. This also provides the opportunity that the returned sludge may be separated by the magnetic separator 50. Thus, the sludge removal performance of the purifier 72 improves.

Figure 8:
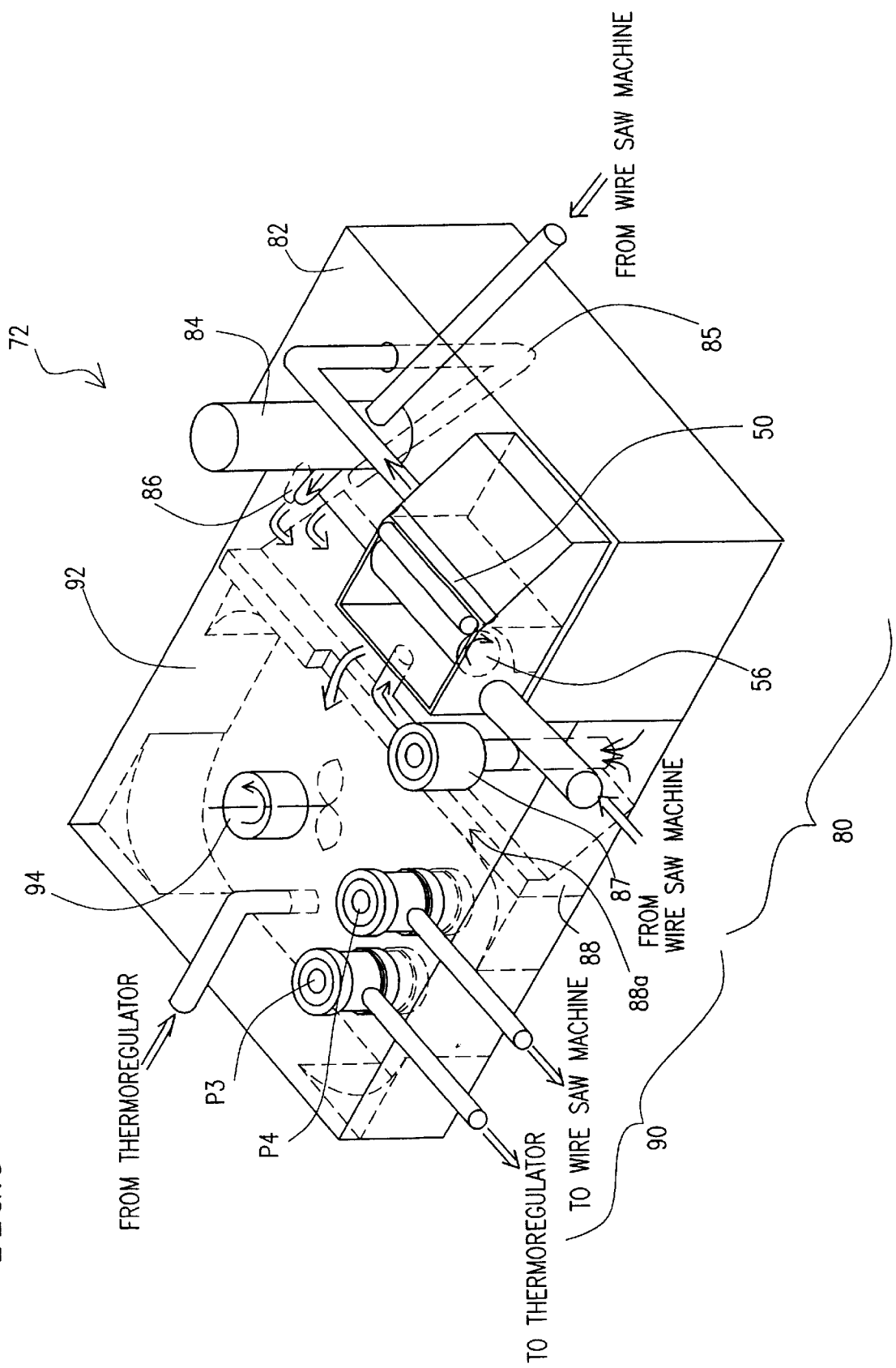
FIG. 8 is a perspective view of a purifier provided for the circulating system shown in FIG. 7.

In order to prevent the sludge from rising in the cutting fluid up to near the fluid surface and also allow the sludge to be settled near the suction port of the sludge-absorbing pump 87, it is desirable to form a slope on the partition 88 for gathering the sludge as illustrated in FIG. 8 and arrange the outlets of the pipes 85 and 86 at appropriate positions.

The supernatant portion of the cutting fluid in the separation reservoir 82 moves to the thermoregulation reservoir 92 through the communicating portion 88a. The capacity of the thermoregulation reservoir 92 is set at 400 L, for example. The cutting fluid reserved in the thermoregulation reservoir 92 contains very little sludge.

The cutting fluid reserved in the thermoregulation reservoir 92 is sent to the thermoregulator 74 (see FIG. 7) via a pump P3. After passing through the thermoregulator 74 for temperature reduction, the cutting fluid is returned to the thermoregulation reservoir 92. Since the cutting fluid has been subjected to sludge removal in the separation section 80 before being sent to the thermoregulator 74, deposit of sludge will not occur in the thermoregulator 74. Therefore, the heat exchange efficiency of the thermoregulator 74 will not be lowered due sludge deposits, and thus effective thermoregulation of the cutting fluid is realized.

In this embodiment, the pump P3 and the thermoregulator 74 are activated when the temperature of the cutting fluid in the thermoregulation reservoir 92 rises to a predetermined value or higher, and they are inactivated when the temperature decreases to a predetermined value or lower. All of the cutting fluid is not sent to the thermoregulator 74, but part of the cutting fluid is sent thereto for a predetermined period of time. The part of the cutting fluid returned from the thermoregulator 74 after thermoregulation and the remaining cutting fluid left in the thermoregulation reservoir 92 are mixed by a stirrer 94 so that the temperature of the cutting fluid in the thermoregulation reservoir 92 is made uniform. If the thermoregulated cutting fluid is directly supplied to the main portion of the wire saw machine, the temperature of the cutting fluid will suddenly change. By the above mixing, sudden temperature change is prevented. If the cutting fluid can be supplied to the main portion of the wire saw machine at a stable temperature, no large change will be observed in the viscosity of the cutting fluid and the like. This ensures stable cutting of the wire saw machine. Thus, in this embodiment, the temperature of the cutting fluid reserved in the thermoregulation reservoir 92 can be kept within a predetermined range by effectively operating the thermoregulator 74.

The temperature of the cutting fluid may sometimes decrease due to a factor such as a decrease of room temperature, causing the viscosity of the cutting fluid to increase beyond a predetermined range. If this happens, the sludge becomes more resistant to discharging and thus the cutting resistance increases. Also, the sludge removal ability of the magnetic separator may decrease. In such an occurrence, it is advantageous to raise the temperature of the cutting fluid by operating the thermoregulator 72 to reduce the viscosity of the cutting 5 fluid.

The cutting fluid thermoregulated in the thermoregulation reservoir 92 is supplied to the main portion 30 (see FIG. 7) of the wire saw machine via a pump P4. The temperature of the cutting fluid supplied between the wire and the rare earth magnet is preferably controlled to fall within the range of 15 to 35° C., more preferably within the range of 20 to 25° C.

Thus, in this embodiment, while the supply and recovery of the cutting fluid are performed in a cyclic fashion, the separation and removal of the sludge are carried out efficiently, and also temperature control of the cutting fluid is performed to maintain the viscosity of the cutting fluid within a suitable range. By these measures, sludge can be discharged from the cut groove appropriately and thus the cutting resistance is kept at a low level. This increases the cutting efficiency and thus enhances the precision at the cut face. As a result, replacement of the cutting fluid is not required for a considerably long duration, and thus the cutting process can be performed continuously for a very long period of time.

Hereinafter, the cutting speed, the viscosity of the cutting fluid, the planarity of the work cutting, and the like will be described in detail with reference to FIGS. 9 through 13.

Figure 9:
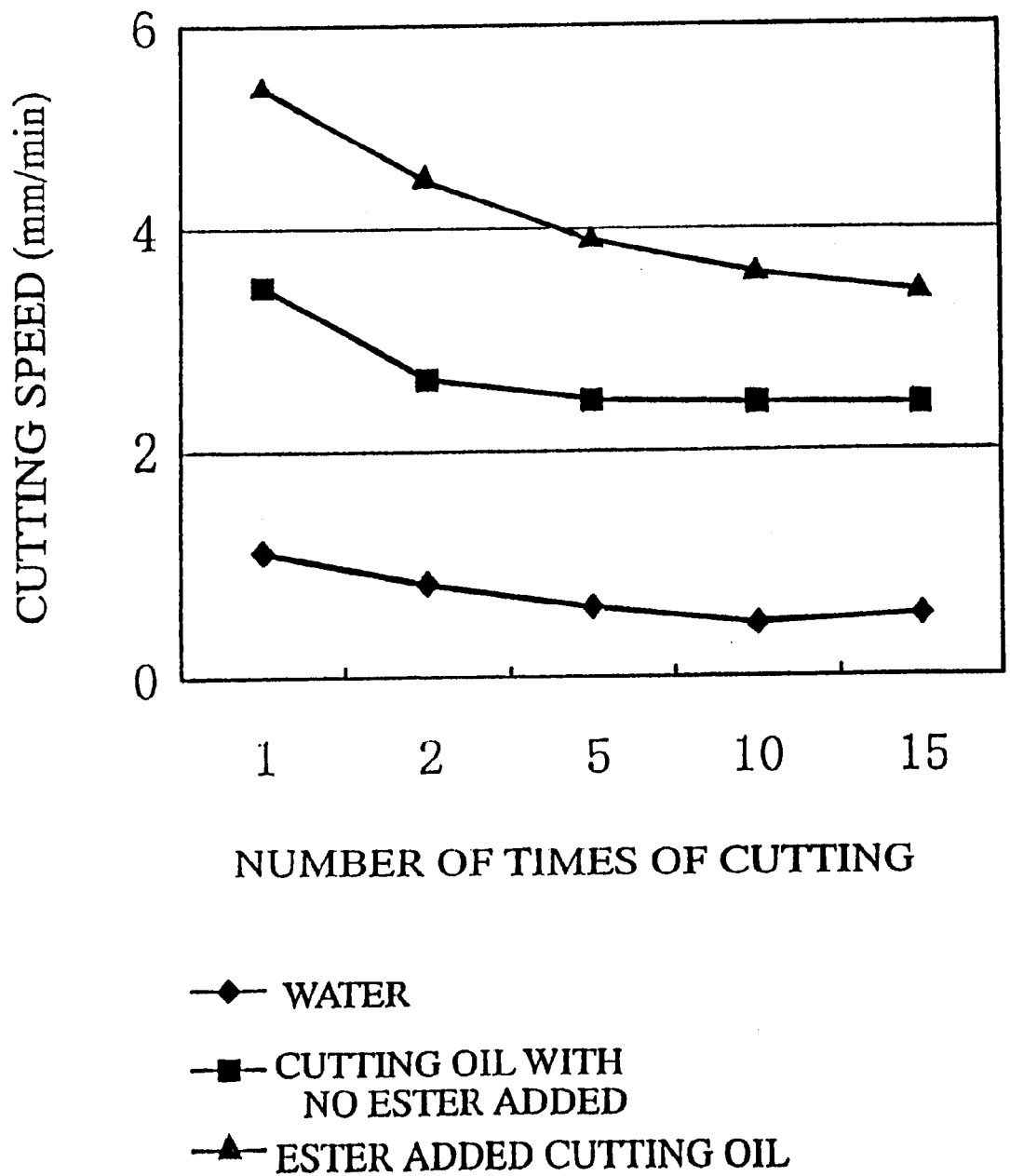
FIG. 9 is a graph showing how the cutting speed changes with the number of times of cutting when water and cutting fluids are used for cleaning of sludge.

FIG. 9 is a graph showing the results of an experiment and represents how the cutting speed changes with the number of times of cutting when water and cutting fluids are used for sludge washing. In the graph of FIG. 9, the black triangle marks, the black square marks, and the black rhombus marks represent the cases of using an ester-added cutting oil, a cutting oil with no ester added, and water, respectively.

In the experiment, a 30 m-long wire was wound around a drum and moved at a speed of 200 m/min. The moving direction of the wire was changed alternately. The wire used had a core diameter of 0.18 mm, a finished diameter of 0.24 mm, and a breaking load of 7 to 8.5 kgf (i.e., 68.6 to 83.4 N). The size of the abrasive grains was 40 to 60 μm, and the thickness of the phenol resin coat film was 30 to 60 μm. The work was pressed against the wire under a constant-pressure load for cutting. The cutting oil or water was dropped to the cutting portion during the cutting process, and after the lapse of a predetermined time (e.g., three minutes), the depth of the groove formed into the work was measured. The value obtained by dividing the cut depth by the cutting time is defined as the "cutting speed" in FIG. 9. After completion of the first cutting, another portion of the work was pressed against the wire to perform the cutting process for this portion. In this way, a total of 15 times of cutting process were performed, and each time the cutting speed was measured. The abscissa of the graph of FIG. 9 represents these 15 times of cutting process.

As is observed from FIG. 9, when water was used for washing off sludge, the cutting speed was extremely low. With this slow cutting, the merit of employing the wire saw machine of fixed abrasive grain type in place of the free abrasive grain type is lost. When the ester-added cutting oil was used, the cutting speed was about 1.5 times as high as that obtained when the cutting oil with no ester added was used.

Figure 10:
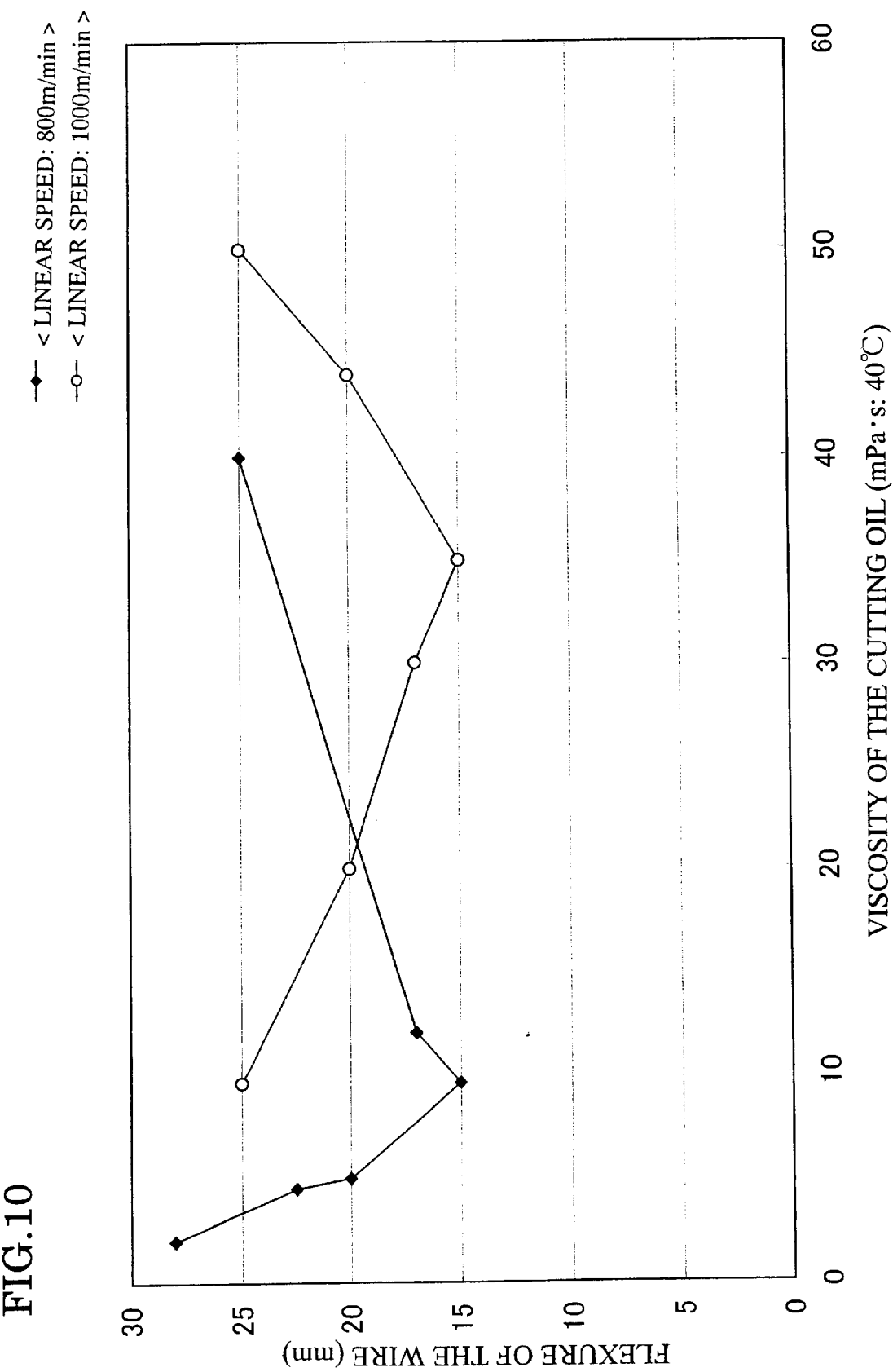
FIG. 10 is a graph showing the relationship between the viscosity of a cutting oil and the flexure of the wire.

FIG. 10 shows the relationship between the flexure of the wire and the viscosity of the cutting oil. An experiment was performed using the wire saw machine shown in FIG. 4. The work was lowered at roughly a constant speed in the range of 0.5 to 1.0 mm/min. The wire moved at linear speeds of 800 m/min and 1,000 m/min. In the graph of FIG. 10, the black rhombus marks and white circle marks represent the cases of the linear speeds of the moving wire of 800 m/min and 1,000 m/min, respectively.

If the cutting of the work by the wire does not proceed smoothly, the flexure of the wire increases. Accordingly, a large flexure indicates that the cutting resistance of the work is large and the efficiency of the work cutting is poor. Conversely, a small flexure indicates that the efficiency of the work cutting is good.

As is observed from FIG. 10, in the case of the linear speed of the moving wire of 800 m/min, when a cutting oil having a viscosity at 40° C. in the range of 4.0 to 40.0 mPa·sec is used, the flexure is 25 mm or less. This indicates that good cutting efficiency is obtained. In particular, when a cutting oil having a viscosity at 40° C. in the range of 4.5 to 20.0 mPa·sec is used, the flexure is less than 20 mm, indicating that the cutting efficiency further improves. In the case of the linear speed of the moving wire of 1,000 m/min, when a cutting oil having a viscosity at 40° C. in the range of 9.5 to 50.0 mPa·sec is used, the flexure is 25 mm or less, indicating that good cutting efficiency is obtained.

In the above experiment, note that the cutting oil supplied between the wire and the work is kept at an appropriate temperature (about 25° C.) by circulating the cutting fluid under thermoregulation. As for the cutting oil having a viscosity at 40° C. in the range of 4.0 to 40.0 mPa·sec described above as suitable for the case of the linear speed of the moving wire of 800 m/min, the kinematic viscosity of this cutting oil at about 25° C. is in the range of 6.0 to 90.0 mm²/s. Likewise, as for the cutting oil having a viscosity at 40° C. in the range of 9.5 to 50.0 mPa·sec described above as suitable for the case of the linear speed of moving wire of 1,000 m/min, the kinematic viscosity of this cutting oil at about 25° C. is in the range of 13.0 to 100.0 mm²/s. Namely, the flexure of the wire can be suppressed to 25 mm or less if a cutting fluid having a kinematic viscosity in the range of 6.0 to 100.0 mm²/s is supplied between the wire and a rare earth alloy and the wire speed is set appropriately.

If the viscosity of the cutting fluid supplied to the wire is out of a predetermined range, sludge of a rare earth alloy tends to be deposited in a cut groove. This increases the cutting resistance and thus reduces the cutting efficiency. As a result, the flexure of the wire increases. In consideration of this, the viscosity of the cutting oil at 40° C. is preferably set at a value in the range of 4.0 to 40.0 mPa·sec, more preferably in the range of 4.5 to 20 mPa·sec. When the wire speed is comparatively high, the viscosity of the cutting oil at 40° C. is preferably set at a value in the range of 9.5 to 50.0 mPa·sec.

By using a cutting oil as defined above, a cutting fluid having a kinematic viscosity in the range of 6.0 to 100.0 mm²/s is preferably supplied between the wire and a rare earth alloy. With the supply of such a cutting fluid, increase in cutting resistance is suppressed and high cutting efficiency is attained. The range of the preferable kinematic viscosity may more or less vary depending on the wire speed as described above. Therefore, it is more preferable to supply a cutting fluid having a kinematic viscosity in the range of 13.0 to 90.0 mm²/s for ensuring proper cutting of a magnet for a wider range of wire speed.

Next, referring to FIGS. 11 and 12, the influence of the viscosity on the cutting performance will be described for the case of using a glycolic water-soluble cutting fluid.

Figure 11:
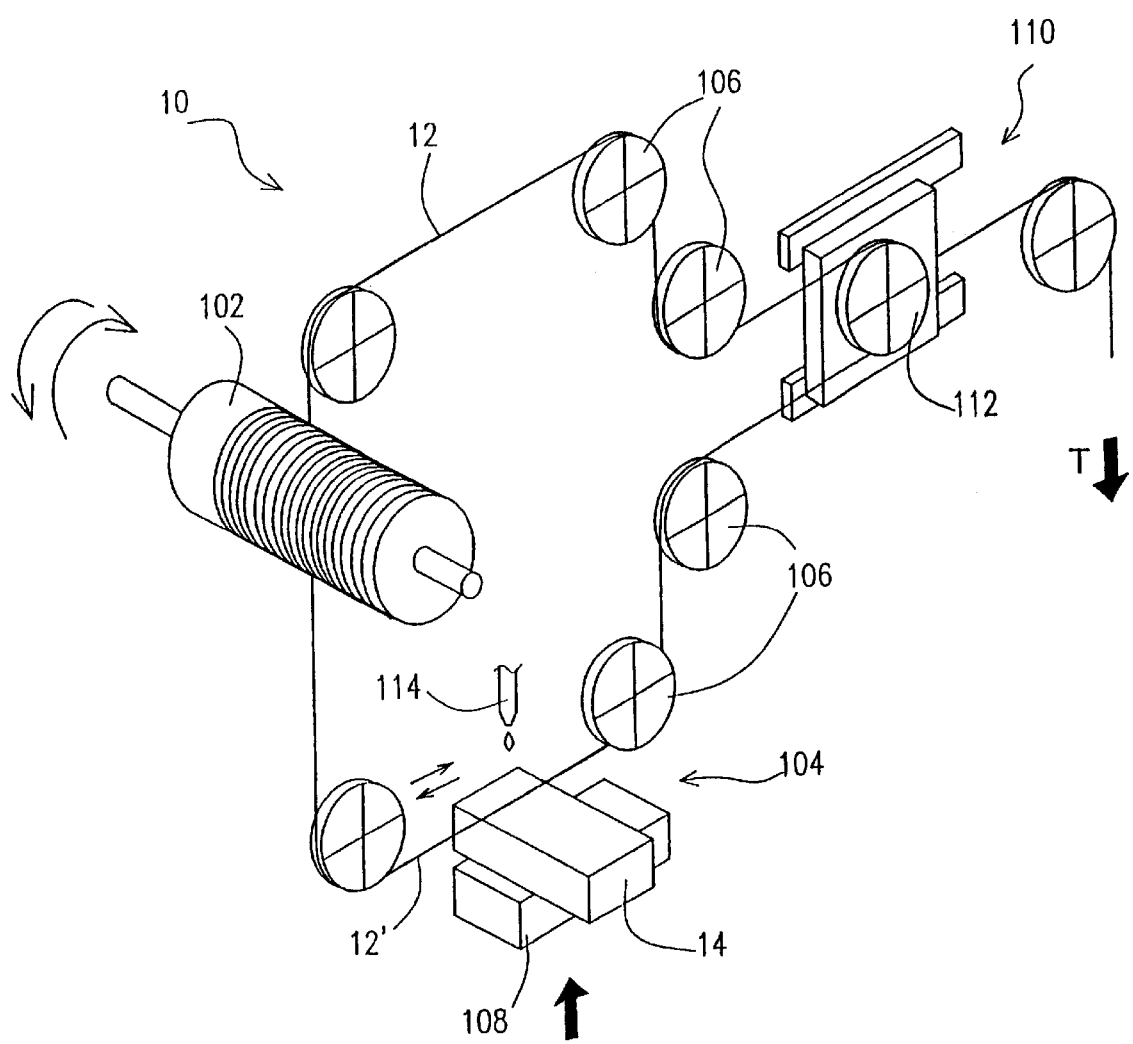
FIG. 11 is an illustration of a test machine used for examining the relationship between the viscosity of a glycolic water-soluble cutting fluid and the cutting performance.

FIG. 11 is a schematic illustration of a test machine (evaluation machine) 10 used for an experiment to be described later with reference to FIG. 12. The test machine 10 includes: a drum 102, around which a wire 12 for cutting is wound and of which rotational axis is connected to a driving motor (not shown); a plurality of pulleys 106 for guiding the wire 12 along a route that starts from the drum 102, passes a cutting region 104 where an object to be cut (work) 14 is cut, and returns to the drum 102; and a moving device 108 capable of linearly moving the work 14 toward the wire 12 to press the work 14 against the wire 12 in the cutting region 104. A tension adjuster 110 is disposed at some midpoint on the route of the wire 12. The tension adjuster 110 provides tension for the wire 12 by exerting an external urging force T on a mobile pulley 112 around which the wire 12 runs, whereby the wire 12 is prevented from sagging. The tension adjuster 110 is also constructed to allow the mobile pulley 112 to move inward against the urging force T when the wire 12 has a tension exceeding a predetermined limit due to pressing of the work 14 on the wire 12 and the like. By this adjustment, while the tension exerted on the wire 12 is relieved, the stress exerted by the wire 12 on the work 14 can be kept in equilibrium (that is, the wire 12 can press the work 14 at a constant pressure).

A cutting fluid supply nozzle 114 is disposed above the wire 12' in the cutting region 104, for dropping or spraying the cutting fluid toward the wire 12'. The cutting fluid once supplied to the wire 12' is discarded, not reused. Therefore, the temperature of the cutting fluid supplied to the wire 12' is kept roughly constant.

Using the test machine 10 with the above construction, an experiment was performed to measure cutting performance. In the experiment, a glycolic water-soluble cutting fluid was dropped toward the wire 12' from the nozzle 114. The direction of the rotation of the drum 102 was periodically reversed to effect bidirectional movement of the wire 12' at a linear speed of 200 m/min. By properly setting the urging force T and the moving speed of the moving device 108, the work 14 was pressed against the wire 12' at a constant pressure 4N to effect cutting under a constant-pressure load. A block of rare earth sintered magnet was used as the work 14.

As the cutting fluid, glycolic water-soluble cutting fluids having different viscosities (WL-1 to WL-5 of Yushiro Chemical Industry Co., Ltd.) were used at a temperature of about 25° C. The kinematic viscosities of the cutting fluids at 25° C. were in the range of 10.0 to 67.0 mm²/s.

Figure 12:
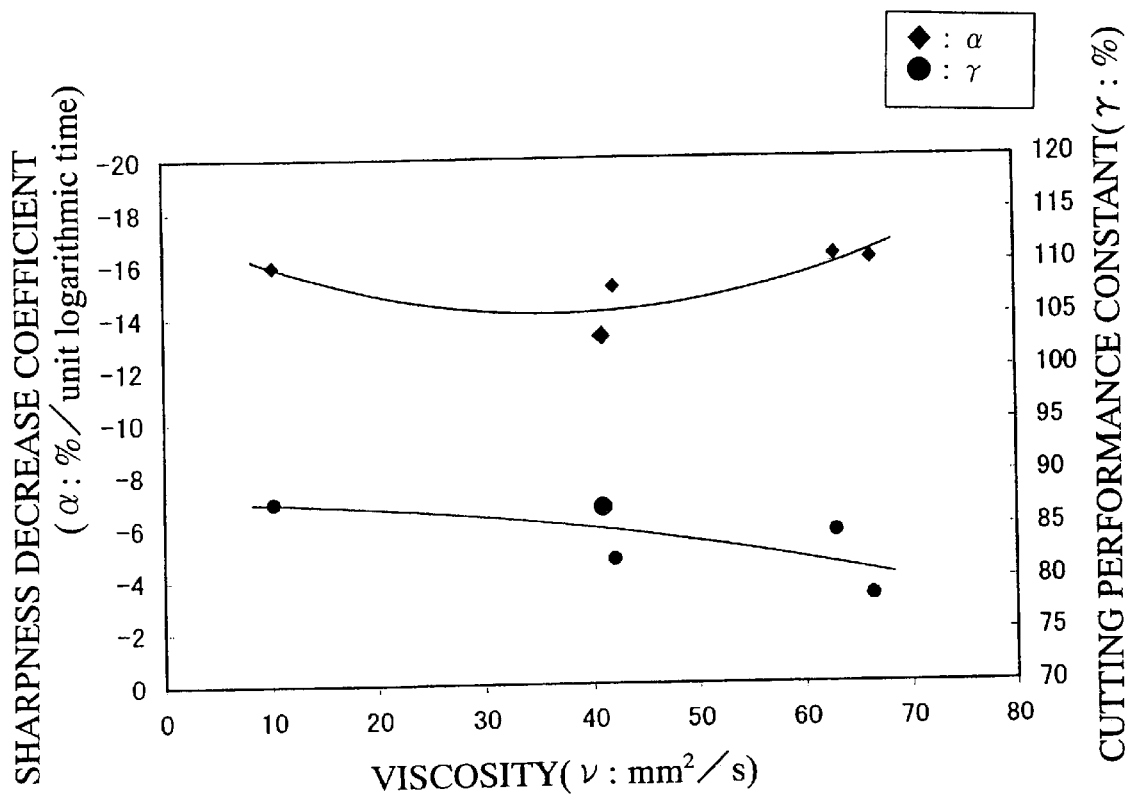
FIG. 12 is a graph showing the relationship between the viscosity of a glycolic water-soluble cutting fluid and the cutting performance.

FIG. 12 is a graph showing the relationships of the kinematic viscosity v (mm²/s) of the cutting fluid with the sharpness decrease coefficient α (%/unit logarithmic time) and with the cutting performance constant γ (%), obtained from the experiment using the test machine 10. The cutting performance constant γ is a parameter indicating the cutting performance (sharpness) during initial cutting, which is presumably influenced by the easiness of sludge discharge and the like, in particular. The sharpness decrease coefficient α is a parameter indicating the rate of decrease of the cutting performance with time (α<0), which presumably represents wear of the wire, in particular. Specifically, the cutting performance constant γ and the sharpness decrease coefficient α are values satisfying equation (1) below:

$$Y = \alpha \ln(t) + \gamma \quad (1)$$

Wherein t denotes the cutting time (three minutes are defined as one unit) and Y denotes the cutting performance ratio. The cutting performance ratio Y is defined as the cutting performance with respect to the initial cutting performance in the case of using a cutting oil having a kinematic viscosity at 25° C. of 16 mm²/s (equivalent to the viscosity at 40° C. of 9.6 mpa·sec; see FIG. 10) as 100%. The cutting performance is determined by measuring the depth of a cut groove formed into the rare earth alloy with the wire. From equation (1), it is found that the cutting performance constant γ represents the cutting performance ratio (with respect to that in the case of using the cutting oil) obtained after three minutes (t=1), and that the sharpness decrease coefficient α represents the change rate of the cutting performance with the logarithmic time (ln(t)).

As is observed from the graph of FIG. 12, when the glycolic water-soluble cutting fluids having kinematic viscosities v at 25° C. in the range of 10.0 to 67.0 mm²/s are used, the cutting performance constants γ are less than 100%, which are lower than that obtained when the above cutting oil is used. However, the cutting performance constants γ of the water-soluble cutting fluids used are more than 75%. With this level of the cutting performance, cutting of a rare earth alloy can be made comparatively efficiently. The sharpness decrease coefficients α of the glycolic water-soluble cutting fluids having the kinematic viscosities within the above range are −16.5 (%/unit logarithmic time) or higher. This indicates that the sharpness will not to decrease so largely even after long-time continuous cutting. The sharpness decrease coefficients a of the glycolic water-soluble cutting fluids are sufficiently acceptable compared with that obtained when cutting water is used.

The use of the glycolic water-soluble cutting fluid reduces the cutting efficiency compared with the use of the specific cutting oil as described above. However, the glycolic water-soluble cutting fluid has the following advantages. The workability is good because no oil mist or the like is generated. A water-soluble cutting fluid is less likely to pollute the environment. In this aspect, it is more desirable to use a water-soluble cutting fluid than a cutting oil. It is comparatively easy to remove sludge from a water-soluble cutting fluid. Therefore, if a cutting fluid is circulated for reuse, a water-soluble cutting fluid is suitable than a cutting oil.

In view of the above, when a glycolic water-soluble cutting fluid is used, the kinematic viscosity thereof at 25° C. should desirably be set at 10.0 to 67.0 mm²/s. In particular, it is preferable to use a glycolic water-soluble cutting fluid having a kinematic viscosity at 25° C. of about 41 mm²/s (WL-2 of Yushiro Chemical Industry Co., Ltd.). By using such a glycolic water-soluble cutting fluid, cutting of a rare earth alloy can be made efficiently without causing problems such as environmental pollution.

Figure 13:
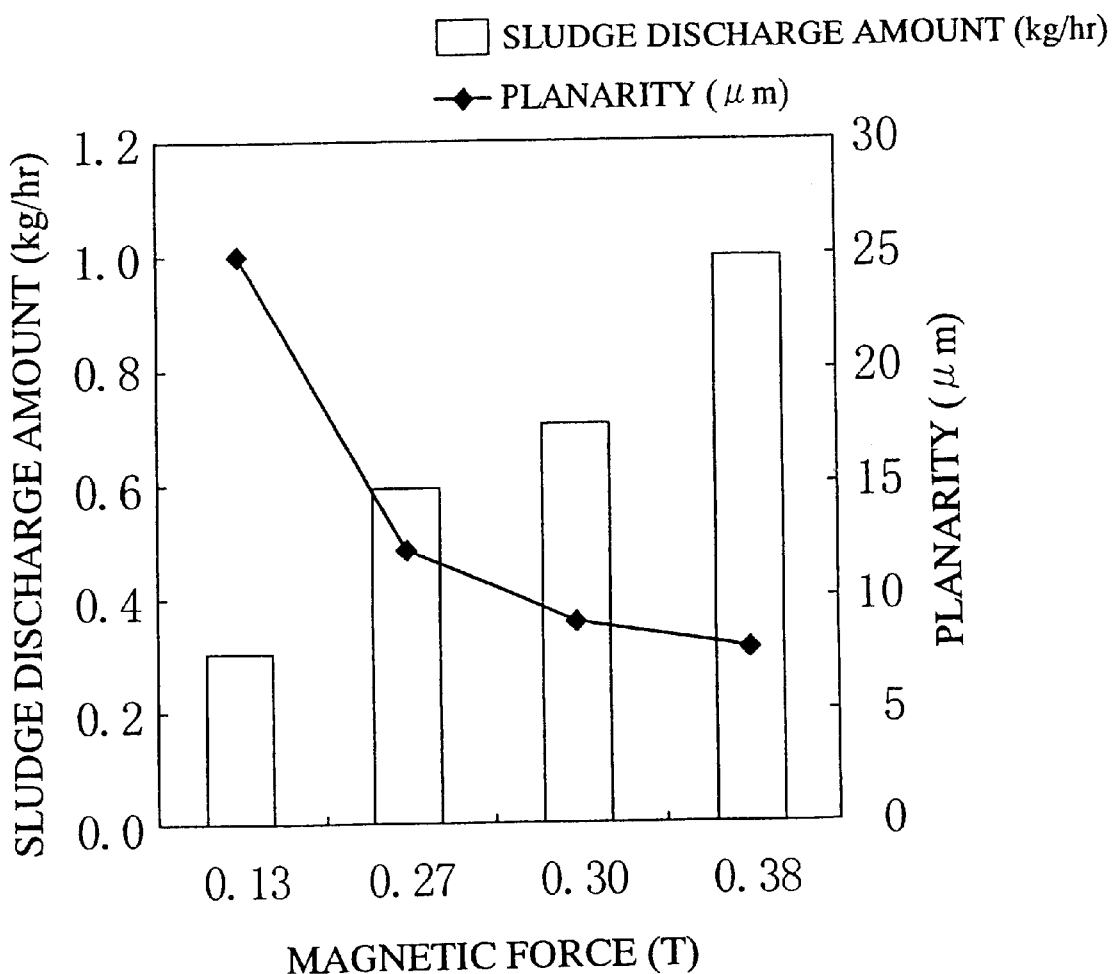
FIG. 13 is a graph showing the relationship between the magnetic force of a magnetic separator and the planarity of a cut face of a work.

FIG. 13 is a graph showing the relationships of the magnetic force at the sludge collection face (in the sludge attraction region) of the magnetic separator with the planarity of the cut face of the work and with the sludge discharge amount (amount of sludge removed from a cutting fluid per hour). The data used for the graph of FIG. 13 was obtained under the condition that 1 kg/hour sludge was washed off the cut face of the work into the cutting fluid. The magnetic force (surface magnetic flux density) was measured using a gauss meter and a probe (both available from Bell, Inc.) with the probe being placed in contact with the sludge collection face of the magnetic separator.

As is observed from FIG. 13, as the magnetic force at the magnetic separator increases, the sludge discharge amount increases and the planarity of the cut face of the work improves. If the amount of sludge separated and discharged from the cutting fluid by the magnetic separator is small, the planarity of the cut face decreases presumably for the following reason. If the sludge discharge amount decreases, sludge attraction and separation are not sufficient, resulting in increase in sludge concentration. This increases the sludge concentration of the cutting fluid supplied to the region where cutting with the wire is underway. As a result, the cutting resistance against the wire increases, causing the wire to sag, and thus the planarity of the cut face decreases. It should also be noted that, by properly removing sludge of a rare earth alloy from the cutting fluid by the magnetic separator, there is provided the effect that the machine can operate continuously for a longer period of time without the necessity of overall replacement of the cutting fluid, in addition to the effect of improvement in planarity described above.

If the planarity of the cut face of the work exceeds 100 μm, the entire work efficiency decreases if the time taken to perform grinding in a subsequent process step is taken into consideration. Therefore, the planarity is preferably 15 μm or less. The magnetic force is preferably adjusted so that the planarity of the cut face is 15 μm or less. To attain this, the magnetic force at the drum surface of the magnetic separator should preferably be set at 0.27 tesla or more, more preferably 0.30 tesla or more.

Referring back to FIG. 1, the rare earth alloy plates formed by cutting in the manner described above are finished by grinding for adjustment of the size and shape. Thereafter, in Step S8, the rare earth alloy plates are subjected to surface treatment for improvement in long-term reliability. In Step S9, magnetizing is performed. Thus, after passing through a testing process, a neodymium permanent magnet is completed.

EXAMPLE 1

Case of Using Cutting Oil Under Thermoregulation

A rare earth alloy was cut using the wire saw machine shown in FIG. 7. A cutting oil (HT-9) of Yushiro Chemical Industry Co., Ltd. was used as the cutting fluid. An automatic thermoregulator (KTC-3B) of Kanto Seiki Co., Ltd. having both cooling and heating functions was used as the thermoregulator.

As the wire for cutting, used was a wire having a core diameter of about 0.18 mm. The thickness of the phenol resin coat film was about 20 μm. Abrasive grains made of diamond having a size of about 40 to 60 μm were stuck on the wire at an average distance between the centers of adjacent grains of about 100 μm. The wire was moved at a linear speed of about 800 m/min. The wire saw machine was operated under the conditions of the new wire supply amount of 2 m/min and the wire tension of 30 N. As the object to be cut, seven 20 mm×40 mm×60 mm rare earth alloy blocks were stacked and bonded together, which were lowered at a speed of 40 mm/min to come into contact with the wire.

Cutting of the rare earth alloy was carried out under the above conditions while the thermoregulator was operated to keep the temperature of the cutting oil within the range of 25 to 28° C. After the rare earth alloy was cut to the depth of 180 mm, the cut face was observed. As a result, it was found that the cut face was smooth with the profile irregularity Ra of 0.8 μm or less and Rmax of 7 μm or less. The sliced rare earth alloy plate was found to satisfy the quality required for a magnet used for a voice coil motor. During the cutting, the flexure of the wire was kept roughly constant, and no increase in cutting resistance was observed.

COMPARATIVE EXAMPLE 1

Case of Using Cutting Oil Without Thermoregulation

Cutting of a rare earth alloy was carried out in the same manner as that in Example 1 except that the thermoregulator was not operated. The temperature of the cutting oil that was initially 20° C. rose to 50° C. or higher as the cutting proceeded.

After the rare earth alloy was cut to the depth of 180 mm, the cut face was observed. As a result, it was found that the profile irregularity was lower at the cut face formed at later cutting. The profile irregularity Ra was 1.5 μm or more and Rmax was 15 μm or more, indicating that the cut face had a considerably uneven profile. The sliced rare earth alloy plate failed to satisfy the quality required for a magnet used for a voice coil motor. During the cutting, the flexure of the wire gradually increased, and an increase in cutting resistance was observed.

EXAMPLE 2

Case of Using Glycolic Water-soluble Cutting Fluid Under Thermoregulation

Cutting of a rare earth alloy was carried out in the same manner as that in Example 1 using, in this case, a glycolic water-soluble cutting fluid (WL-2) of Yushiro Chemical Industry Co., Ltd, in place of the cutting oil, keeping the temperature of the cutting fluid within the range of 25 to 28° C.

After the rare earth alloy was cut to the depth of 180 mm, the cut face was observed. As a result, it was found that the cut face was smooth with the profile irregularity Ra of 0.8 μm or less and Rmax of 7 μm or less. The sliced rare earth alloy plate was found to satisfy the quality required for a magnet used for a voice coil motor. During the cutting, the flexure of the wire was kept roughly constant, and no increase in cutting resistance was observed.

COMPARATIVE EXAMPLE 2

Case of Using Glycolic Water-soluble Cutting Fluid Without Thermoregulation

Cutting of a rare earth alloy was carried out in the same manner as that in Example 2 except that the thermoregulator was not operated. The temperature of the glycolic water-soluble cutting fluid that was initially 20° C. rose to 50° C. or higher as the cutting proceeded.

After the rare earth alloy was cut to the depth of 180 mm, the cut face was observed. As a result, it was found that the profile irregularity was lower at the cut face formed at later cutting. The profile irregularity Ra was 1.5 μm or more and Rmax was 15 μm or more, indicating that the cut face had a considerably uneven profile. The sliced rare earth alloy plate failed to satisfy the quality required for a magnet used for a voice coil motor. During the cutting, the flexure of the wire gradually increased, and an increase in cutting resistance was observed.

As described above, the method for manufacturing rare earth alloy plates of the present invention has many advantages as follows:

1) The discharge efficiency of the cutting fluid from the cut face of the work improves. Accordingly, the cutting resistance against the wire decreases and thus long-time continuous cutting is possible.

2) The planarity of the cut face of the work can be enhanced. Accordingly, production yield improves.

3) The cutting efficiency of the wire saw for the rare earth alloy can be optimized.

4) Sludge can be removed efficiently from the cutting fluid. Accordingly, the cutting load applied to the wire at the cut face of the work can be reduced and the cutting speed can be increased, without the necessity of frequent replacement of the cutting fluid.

5) Even if the work collapses, the quality of the products does not deteriorate because the products do not come into contact with the wire.

Thus, hereinbefore, embodiments of the method for manufacturing rare earth alloy plates according to the present invention were described. However, the present invention is not limited to these embodiments. For example, the cutting method of the present invention is appropriately applicable to manufacture of rare earth alloy products and parts having shapes other than plates.

In the foregoing embodiments, a rare earth magnet material (i.e., Nd—Fe—B) was used as the object to be machined. The same effects of the present invention as those described in the above embodiments can also be attained when any other rare earth alloy is used as the object to be machined. This is because rare earth alloys commonly have high cutting resistance and easily allow sludge to aggregate.

When the rare earth magnets are manufactured in accordance with the above-described method, the cutting margin is smaller compared with the case of cutting an ingot of a rare earth alloy using a peripheral cutting edge. Accordingly, the method of the present invention is suitable for manufacturing thinner magnets (having a thickness of 0.5 to 3.0 mm, for example). Recently, the thickness of a rare earth magnet used for a voice coil motor has been increasingly smaller. If such a thin rare earth magnet manufactured by the method of the present invention is attached to a voice coil motor, a high-performance downsized voice coil motor can be provided.

According to the present invention, in the cutting of a rare earth alloy with a wire saw, wire snapping is prevented and the number of times of replacement of a cutting fluid required is significantly reduced. As a result, the machine can be operated continuously for a much longer period of time.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A method for cutting a rare earth alloy comprising the step of:
   providing a cutting wire having abrasive grains stuck thereon; and
   cutting the rare earth alloy while supplying a cutting fluid having a predetermined kinematic viscosity in a range of 6.0 mm$^2$/s to 100.0 mm$^2$/s between the wire and the rare earth alloy.

2. The method of claim 1, wherein the cutting fluid is a cutting oil.

3. The method of claim 2, wherein the cutting oil has a viscosity at 40° C. in a range of 4.0 to 40.0 mPa·sec.

4. The method of claim 1, wherein the cutting fluid is a glycolic water-soluble cutting fluid.

5. The method of claim 4, wherein the glycolic water-soluble cutting fluid has a kinematic viscosity at 25° C. in a range of 10.0 mm$^2$/s to 67.0 mm$^2$/s.

6. The method of claim 1, wherein the kinematic viscosity of the cutting fluid is controlled by controlling the temperature of the cutting fluid.

7. The method of claim 6, further comprising the steps of:
   recovering the cutting fluid containing sludge of the rare earth alloy generated during the cutting of the rare earth alloy; and
   removing the sludge from the recovered cutting fluid before controlling the temperature of said cutting fluid.

8. The method of claim 7, wherein controlling the temperature of the cutting fluid comprises the steps of: thermoregulating part of the cutting fluid from which the sludge has been removed; and mixing the thermoregulated part of the cutting fluid and the remaining cutting fluid forming a mixed cutting fluid.

9. The method of claim 1, wherein a sludge of the rare earth alloy generated during said cutting of the rare earth alloy is separated from the cutting fluid using a magnetic force.

10. The method of claim 9, further comprising the step of disposing a magnetic separator capable of generating a magnetic force of at least 0.27 tesla in a region for collecting the sludge from the cutting fluid.

11. The method of claim 1, wherein said cutting step is performed using a wire saw machine comprising:
    a plurality of rollers supported rotatably, each of the rollers having a plurality of ring-shaped grooves formed on an outer circumference of the roller at a predetermined pitch, said wire being wound along the grooves of said rollers and between said rollers; and
    driving means for rotating at least one of said rollers.

12. The method of claim 11, Wherein the rare earth alloy is cut with the wire while the tare earth alloy is moved from a position above the wire to a position below the wire.

13. The method of claim 12, further comprising the steps of:
    dividing the rare earth alloy into a plurality of blocks, thereby forming gaps between the blocks;
    securing the blocks together; and
    supplying at least part of the cutting fluid through the gaps between the blocks.

14. A method for manufacturing rare earth alloy plates, comprising the steps of:
    producing an ingot of a rare earth alloy; and
    cutting one or more rare earth alloy plates from the ingot by a method comprising the step of:
       providing a cutting wire having abrasive grains stuck thereon; and
       cutting the rare earth alloy while supplying a cutting fluid having a predetermined kinematic viscosity in a range of 6.0 mm$^2$/s to 100.0 mm$^2$/s between the wire and the rare earth alloy.

15. A method for manufacturing rare earth magnets, comprising the steps of:
    producing a sintered body from rare earth magnetic alloy powder; and
    cutting one or more rare earth magnets from the sintered body by a method comprising the step of:
       providing a cutting wire having abrasive grains stuck thereon; and
       cutting the rare earth alloy while supplying a cutting fluid having a predetermined kinematic viscosity in a range of 6.0 mm$^2$/s to 100.0 mm$^2$/s between the wire and the rare earth alloy.

16. A voice coil motor comprising a rare earth magnet manufactured by a method comprising the steps of
    producing a sintered body from rare earth magnetic alloy powder; and cutting one or more rare earth magnets from the sintered body by a method comprising the step of:
  providing a cutting wire having abrasive grains stuck thereon; and
  cutting the rare earth alloy while supplying a cutting fluid having a predetermined kinematic viscosity in a range of 6.0 mm²/s to 100.0 mm²/s between the wire and the rare earth alloy.

17. The voice coil motor of claim 16, wherein the thickness of said rare earth magnet is in a range of 0.5 to 3.0 mm.

18. An apparatus for cutting a rare earth alloy with a wire, comprising:
  a wire having abrasive grains' stuck thereon;
  means for supplying a cutting fluid having a predetermined kinematic viscosity in a range of 6.0 mm²/s to 100.0 mm²/s between the wire and the rare earth alloy; and
  viscosity control means for controlling the kinematic viscosity of said cutting fluid supplied, between said wire and the rare earth alloy by controlling the temperature of said cutting fluid.

19. The apparatus of claim 18, wherein said viscosity control means comprises:
  a vessel for storing said cutting fluid;
  a thermoregulator for controlling the temperature of at least part of said cutting fluid stored in said vessel; and
  a stirrer for stirring said cutting fluid stored in said vessel.

20. The apparatus of claim 18, further comprising a magnetic separator for separating sludge of the rare earth alloy generated during the cutting of the rare earth alloy from said cutting fluid.

21. The apparatus of claim 20, wherein said magnetic separator generates a magnetic force of at least 0.27 tesla.

22. An apparatus for cutting a rare earth alloy with a wire, comprising:
  a wire having abrasive grains stuck thereon;
  means for supplying a cutting fluid having a predetermined kinematic viscosity in a range of 6.0 mm²/s to 100.0 mm²/s between the wire and the rare earth alloy; and
  a magnetic separator for separating sludge of the rare earth alloy generated during the cutting of the rare earth alloy from said cutting fluid.

23. The apparatus of claim 22, wherein said magnetic separator generates a magnetic force of at least 0.27 tesla.

* * * * *